United States Patent
Alsaiari et al.

(10) Patent No.: US 11,717,810 B1
(45) Date of Patent: Aug. 8, 2023

(54) NANOCOMPOSITE PHOTOCATALYST AND METHOD OF DEGRADING ORGANIC POLLUTANT THEREWITH

(71) Applicant: NAJRAN UNIVERSITY, Najran (SA)

(72) Inventors: Mabkhoot Alsaiari, Najran (SA); Mohd Faisal, Najran (SA); Md. A. Rashed, Najran (SA); Farid A. Harraz, Najran (SA)

(73) Assignee: NAJRAN UNIVERSITY, Najran (SA)

( * ) Notice: Subject to any disclaimer, the term of this patent is extended or adjusted under 35 U.S.C. 154(b) by 0 days.

(21) Appl. No.: 17/698,034

(22) Filed: Mar. 18, 2022

(51) Int. Cl.
| | |
|---|---|
| *B01J 23/00* | (2006.01) |
| *B01J 23/66* | (2006.01) |
| *B01J 35/00* | (2006.01) |
| *B01J 37/08* | (2006.01) |
| *B01J 21/18* | (2006.01) |
| *B01J 37/34* | (2006.01) |

(52) U.S. Cl.
CPC .............. *B01J 23/66* (2013.01); *B01J 21/18* (2013.01); *B01J 35/004* (2013.01); *B01J 35/0013* (2013.01); *B01J 37/08* (2013.01); *B01J 37/345* (2013.01)

(58) Field of Classification Search
None
See application file for complete search history.

(56) References Cited

U.S. PATENT DOCUMENTS

| | | | |
|---|---|---|---|
| 11,059,031 B2 | 7/2021 | Yang et al. | |
| 2017/0206997 A1* | 7/2017 | Al-Harthi | ................. C08J 5/18 |
| 2020/0371190 A1* | 11/2020 | Sejimo | ..................... G01S 19/16 |
| 2020/0391190 A1 | 12/2020 | Alomair et al. | |

FOREIGN PATENT DOCUMENTS

| | | | |
|---|---|---|---|
| CN | 102380379 B | | 4/2014 |
| CN | 104959141 A | * | 10/2015 |
| CN | 109225217 B | | 3/2021 |

OTHER PUBLICATIONS

CN 104959141 A—English translation (Year: 2015).*
Chang, et al. ; C-doped ZnO decorated with Au nanoparticles constructed from the metal-organic framework ZIF-8 for photodegradation of organic dyes ; Royal Society of Chemistry, 9 ; Apr. 26, 2019.
Rambabu, et al. ; Green synthesis of zinc oxide nanoparticles using *Phoenix dactylifera* waste asa bioreductant for effective dye degradation and antibacterial performance in wastewater treatment ; Journal of Hazardous Materials 42 ; 2021.

(Continued)

*Primary Examiner* — Stefanie J Cohen
(74) *Attorney, Agent, or Firm* — Oblon, McClelland, Maier & Neustadt, L.L.P.

(57) ABSTRACT

A nanocomposite photocatalyst is provided. The nanocomposite photocatalyst contains a carbon nanomaterial made of amorphous carbon and graphitic carbon, metal oxide nanoparticles disposed on the carbon nanomaterial, and noble metal nanoparticles disposed on the metal oxide nanoparticles and/or the carbon nanomaterial. Also provided is a method of forming the nanocomposite photocatalyst and a method of photodegrading an organic pollutant in water using the nanocomposite photocatalyst and visible light irradiation.

9 Claims, 10 Drawing Sheets

(56) References Cited

OTHER PUBLICATIONS

Alomair, et al. ; Single step green synthesis of Au/ZnO/rGO nanocomposites for visible light photocatalytic application ; Materials Research Express, vol. 6, No. 11 ; Oct. 11, 2019.
Faisal, et al. ; Smart chemical sensor and active photo-catalyst for environmental pollutants ; Chemical Engineering Journal 173 ; pp. 178-184; Jul. 26, 2011.
Faisal, et al. ; Photocatalysed degradation of two selected dyes in UV-irradiated aqueous suspensions of titania ; Dyes and Pigments 72 ; pp. 233-239 ; Oct. 20, 2005.
Bouzid, et al. ; Synthesis of mesoporous Ag/ZnO nanocrystals with enhancedphotocatalytic activity ; Catalysis Today 252 ; pp. 20-26; Nov. 4, 2014.
Gogate, et al. ; A review of imperative technologies for wastewater treatment II: hybrid methods ; Advances in Environmental Research 8 ; pp. 553-597 ; Apr. 4, 2003.
Augugliaro, et al. ; The combination of heterogeneous photocatalysis with chemical and physical operations: A tool for improving the photoprocess performance ; Journal of Photochemistry and Photobiology C: Photochemistry Reviews 7 ; pp. 127-144 ; Jan. 4, 2007.
Ischay, et al. ; Efficient Visible Light Photocatalysis of [2+2] Enone Cycloadditions ; J. Am. Chem. Soc. 130 ; Sep. 4, 2008.
Banerjee, et al. ; New Insights into the Mechanism of Visible Light Photocatalysis ; J. Phys. Chem. Lettt., 5 ; pp. 2543-2554 ; 2014.
Chen, et al. ; Semiconductor-mediated photodegradation of pollutants under visible-light irradiation ; Chemical Society Reviews 39 ; pp. 4206-4219 ; Oct. 16, 2009.
Ismail, et al. ; Ease synthesis of mesoporous WO3—TiO2 nanocomposites with enhanced photocatalytic performance for photodegradation of herbicide imazapyr under visible light and UV illumination ; Journal of Hazardous Materials 307 ; pp. 43-54 ; Dec. 28, 2015.
Kudo, et al. ; Heterogeneous photocatalyst materials for water splitting ; Chem. Soc. Rev., 38 ; pp. 253-278 ; Nov. 18, 2008.
Muruganandham, et al. ; Optimization of solar photocatalytic degradation conditions of Reactive Yellow 14 azo dye in aqueous TiO2 ; Journal of Molecular Catalysis A: Chemical 246 ; pp. 154-164 ; Dec. 1, 2005.
Sakthivel, et al. ; Solar photocatalytic degradation of azo dye: comparison of photocatalytic efficiency of ZnO and TiO2 ; Solar Energy Materials & Solar Cells 77 ; pp. 65-82 ; Apr. 30, 2002.
Pardeshi, et al. ; Solar photocatalytic degradation of resorcinol a model endocrine disrupter in water using zinc oxide ; Journal of Hazardous Materials 163 ; pp. 403-409 ; Jul. 5, 2008.
Wang, et al. ; CO2-assisted synthesis of mesoporous carbon/C-doped ZnO composites for enhanced photocatalytic performance under visible light ; Dalton Transactions 43 ; Jul. 10, 2014.
Wang, et al. ; Semiconductor heterojunction photocatalysts: design, construction, and photocatalytic performances ; Chem. Soc. Rev., 43 ; Apr. 8, 2014.
Ranasingha, et al. ; Synthesis, characterization, and photocatalytic activity of Au—ZnO nanopyramids ; Journal of Materials Chemistry A, 3 ; Jun. 22, 2015.
Wang, et al. ; ZnO/Au Hybrid Nanoarchitectures: Wet-Chemical Synthesis and Structurally Enhanced Photocatalytic Performance ; Environ. Sci. Technol. 43 ; Oct. 22, 2009.
Alam, et al. ; One-step hydrothermal synthesis of Bi—TiO2 nanotube/ graphene composites: An efficient photocatalyst for spectacular degradation of organic pollutants under visible light irradiation ; Applied Catalysis B: Environmental 218 ; pp. 758-769 ; Jun. 7, 2017.
Kuriakose, et al. ; Facile synthesis of Ag—ZnO hybrid nanospindles for highly efficient photocatalytic degradation of methyl orange ; Phys. Chem. Chem. Phys., 16 ; Jul. 3, 2014.
Ren, et al. ; Synthesis of Ag/ZnO nanorods array with enhanced photocatalytic performance ; Journal of Hazardous Materials 182 ; pp. 123-129 ; Jun. 8, 2010.
Han, et al. ; Ag/ZnO flower heterostructures as a visible-light driven photocatalyst via surface plasmon resonance ; Applied Catalysis B: Environmental 126 ; pp. 298-305 ; Jul. 23, 2012.
Shen, et al. ; Green Synthesis of Carbon- and Silver-Modified Hierarchical ZnO with Excellent Solar Light Driven Photocatalytic Performance ; ACS Sustainable Chemistry & Engineering ; 2015.
Xue, et al. ; Synthesis of Ag/ZnO/C plasmonic photocatalyst with enhanced adsorption capacity and photocatalytic activity to antibiotics ; RSC Advances, 5 ; Feb. 9, 2015.
Wang, et al. ; Improving photocatalytic performance of ZnO via synergistic effects of Ag nanoparticles and graphene quantum dots ; Phys. Chem. Chem. Phys., 17 ; Jun. 15, 2015.
Chen, et al. ; Preparation of carbon microspheres decorated with silver nanoparticles and their ability to remove dyes from aqueous solution ; Journal of Hazardous Materials 283 ; pp. 193-201 ; Sep. 22, 2014.
Ismail, et al. ; A facile synthesis of mesoporous PdeZnO nanocomposites as efficient chemical sensor ; Superlattices and Microstructures 95 ; pp. 128-139 ; Apr. 30, 2016.
Ismail, et al. ; A sensitive and selective amperometric hydrazine sensor based on mesoporous Au/ZnO nanocomposites ; Materials and Design 109 ; pp. 530-538 ; Jul. 21, 2016.
Alshammari, et al. ; Visible-light photocatalysis on C-doped ZnO derived from polymer-assisted pyrolysis ; RSC Advances, 5 ; Mar. 9, 2015.
Zeferino, et al. ; Photoluminescence and Raman Scattering in Ag-doped ZnO Nanoparticles ; J. Appl. Phys. 109 ; Jan. 7, 2011.
Kuang, et al. ; Enhanced hydrogen production by carbon-doped TiO2 decorated with reduced graphene oxide (rGO) under visible light irradiation ; RSC Advances, 6 ; Dec. 17, 2015.
Faisal, et al. ; Polythiophene doped ZnO nanostructures synthesized by modified sol-gel and oxidative polymerization for efficient photodegradation of methylene blue and gemifloxacin antibiotic ; Materials Today Communications 24 ; Mar. 4, 2020.
Zhu, et al. ; In situ loading of well-dispersed gold nanoparticles on two-dimensional graphene oxide/SiO2 composite nanosheets and their catalytic properties ; Nanoscale, 4 ; Dec. 29, 2011.
Li, et al. ; Gold nanoparticles inlaid TiO2 photoanodes: a superior candidate for high-efficiency dye-sensitized solar cells ; Energy & Environmental Science, 6 ; Apr. 25, 2013.
Yousefi, et al. ; Effect of annealing temperature on growth of Ce—ZnO nanocomposite thin films: X-ray photoelectron spectroscopy study; Thin Solid Films 520 ; pp. 721-725 ; 2011.
Zeng, et al. ; Dendritic CdS wrapped with carbon nanotubes with enhanced photocatalytic performance ; Journal of Materials Science: Materials in Electronics ; pp. 6846-6852 ; Feb. 25, 2019.
Jayaraman, et al. ; Enhanced luminescence and charge separation in polythiophene-grafted, gold nanoparticledecorated, 1-D ZnO nanorods ; RSC Advances, 4 ; Feb. 3, 2014.
Lee, et al ; Simple synthesis and characterization of SrSnO3 nanoparticles with enhanced photocatalytic activity ; International Journal of Hydrogen Energy, 37 ; pp. 10557-10563 ; May 16, 2012.
Malato, et al. ; Decontamination and disinfection of water by solar photocatalysis: Recent overview and trends ; Catalysis Today 147 ; pp. 1-59 ; Aug. 3, 2009.
Wang, et al. ; Elastic-Plastic Behavior of AP1000 Nuclear Island Structure under Mainshock-Aftershock Sequences ; Annals of Nuclear Energy ; Sep. 2018.
Kong, et al. ; Visible Light-Driven Photocatalytic Performance of N-Doped ZnO/g-C3N4 Nanocomposites ; Nanoscale Research Letters ; 2017.
Perillo, et al. ; C-doped ZnO nanorods for photocatalytic degradation of paminobenzoic acid under sunlight ; Nanostructures & Nano-Objects 10 ; pp. 125-130 ; Apr. 10, 2017.
Ansari, et al. ; Facile and sustainable synthesis of carbon-doped ZnO nanostructures towards the superior visible light photocatalytic performance ; New J. Chem., 41 ; Jul. 13, 2017.
Park, et al. ; Adsorption and UV/Visible photocatalytic performance of BiOI for methyl orange, Rhodamine B and methylene blue: Ag and Ti-loading effects ; CrystlEngComm, 16 ; Jan. 17, 2014.
Ismail, et al. ; Mesoporous WO3-graphene photocatalyst for photocatalytic degradation of Methylene Blue dye under visible light illumination ; Journal of Environmental Sciences 66 ; pp. 328-337 ; May 10, 2017.

(56) References Cited

OTHER PUBLICATIONS

Faisal, et al. ; Polythiophene/mesoporous SrTiO3 nanocomposites with enhanced photocatalytic activity under visible light ; Separation and Purification Technology 190 ; pp. 33-44 ; 2018.

Jung, et al. ; Enhanced photocatalytic activity of Au-doped Au@ZnO core-shell flower-like nanocomposites ; Journal of Alloys and Compounds 735 ; pp. 2058-2066 ; Dec. 2, 2017.

Zhang, et al. ; A sonochemical approach to hierarchical porous titania spheres with enhanced photocatalytic activity ; Chem. Commun. ; pp. 2078-2079 ; Jul. 2, 2003.

Peng, et al. ; Synthesis of one-dimensional Bi2O3—Bi2O2.33 heterojunctions with high interface quality for enhanced visible light photocatalysis in degradation o fhigh-concentration phenol and MO dyes ; Applied Catalysis B: Environmental 203 ; pp. 946-954; Nov. 9, 2016.

Khan, et al. ; Exploration of CeO2 nanoparticles as a chemi-sensor and photo-catalyst for environmental applications ; Science of the Total Environment 409 ; pp. 2987-2992 ; May 13, 2011.

* cited by examiner

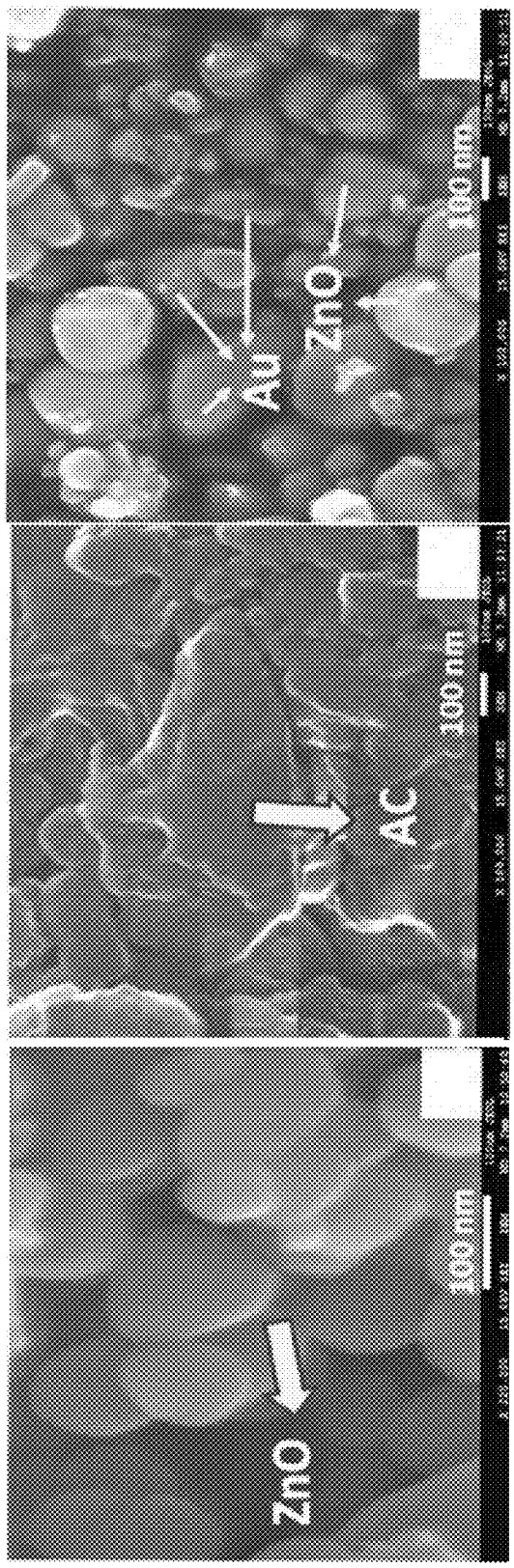
FIG. 4A.
FIG. 4B.
FIG. 4C.
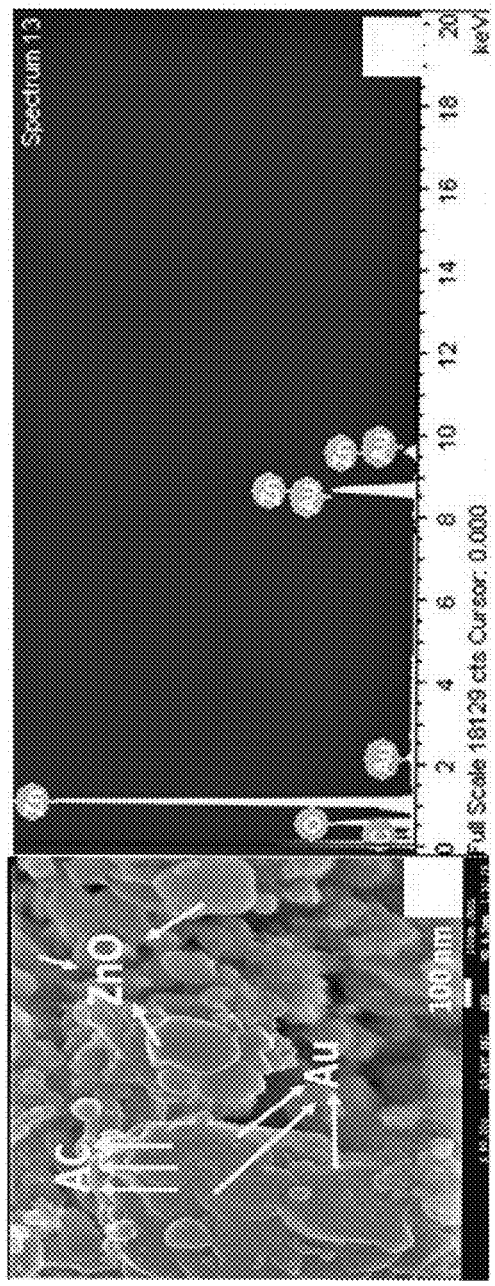
FIG. 4D.
FIG. 4E.

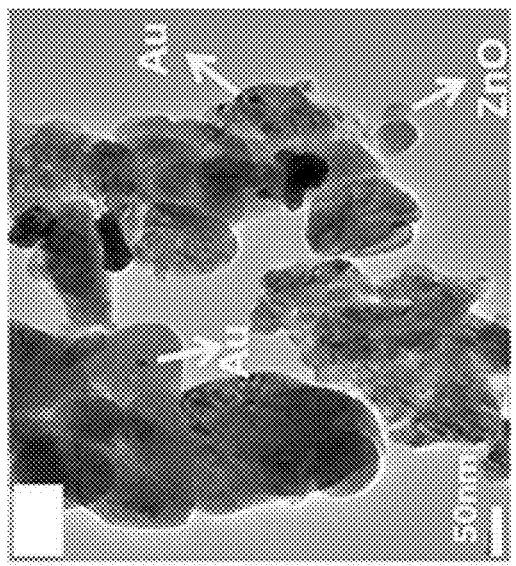
FIG. 5A.  FIG. 5B.  FIG. 5C.
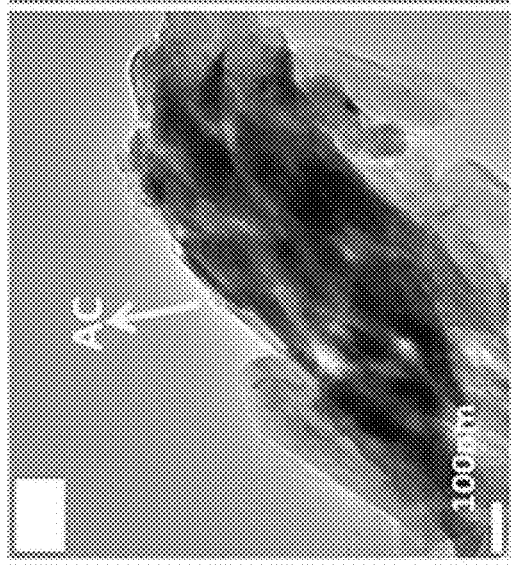
FIG. 5D.
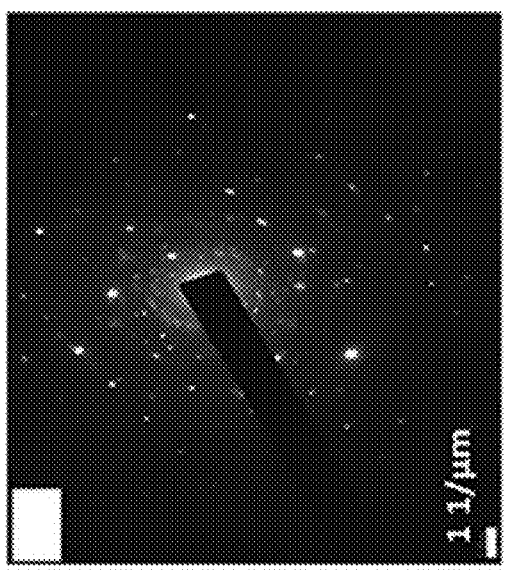
FIG. 5E.  FIG. 5F.
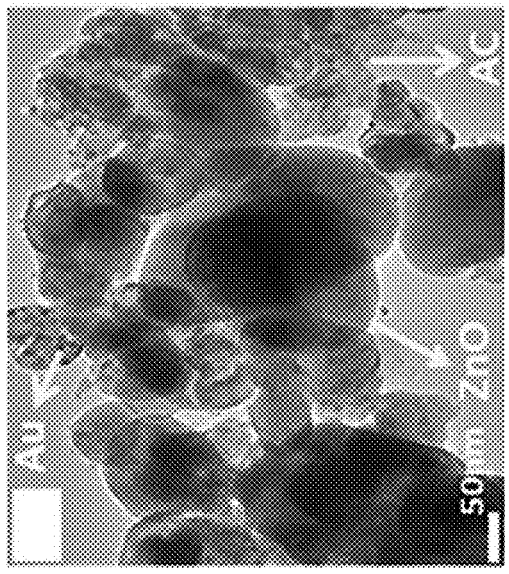

NANOCOMPOSITE PHOTOCATALYST AND METHOD OF DEGRADING ORGANIC POLLUTANT THEREWITH

STATEMENT OF PRIOR DISCLOSURE BY THE INVENTORS

Aspects of this technology are described in the article "Highly Efficient Biomass-derived Carbon@Au/ZnO Novel Ternary Photocatalyst for Ultra-fast Degradation of Gemicloxacin Drug" published in Journal of Materials Research and Technology 2021, Vol 14, Pages 954-967, available on Jul. 6, 2021, which is incorporated herein by reference in its entirety.

BACKGROUND OF THE INVENTION

Field of the Invention

The present disclosure relates to a nanocomposite photocatalyst comprising a carbon nanomaterial, metal oxide nanoparticles, and noble metal nanoparticles, a method of forming the nanocomposite photocatalyst, and a method of photodegrading an organic pollutant in water using the nanocomposite photocatalyst.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Human activity, including both industrial and agricultural activity, despite the best efforts of those performing said activities, introduces undesirable chemical substances, particularly organic compounds, into the environment. Such pollutants, including laboratory waste, pharmaceuticals, dyes, insecticides, herbicides, and the like, can have devastating impacts on human and non-human life etc. This has led to a need for materials and methods which remove or degrade such pollutants. Several strategies have been developed for removing a wide variety of pollutants from water, including adsorptive strategies, precipitation, and flocculation. However, such strategies are disadvantageous for reasons such as specificity of pollutants treated by the method (e.g. a specific sorbent may only work on a limited subset of pollutants) or a transfer of the pollution problem. Such methods simply create a new type of waste which must itself be dealt with, as opposed to degradation or transformation of the pollutants into benign substances.

The advanced oxidation process (AOP) is versatile low cost approach which involves the production of extremely reactive chemical substances such as hydroxyl radicals (·OH) for the rapid, non-selective oxidation of organic pollutants which remain unaffected by common treatment methods [Faisal M, et. al., J Mat Sci Technol, 2011, 29, 594-600; Khan S B, et. al., Sci Total Environ, 2011, 409, 2987-92; Faisal M, et. al., Dyes Pigment, 2007, 72, 233; and Bouzid H, et. al., Catal Today, 2015, 252, 20-6.]. The creation of a visible light-responsive photocatalytic framework requires a proper band gap tailoring for efficient operation with visible light, high surface area for a large number of reactive sites and rapid degradation, and extended electron hole pair (photogenerated) lifetime [Ischay M A, et. al., J Am Chem Soc, 2008, 130, 12886-7]. Defects, which can act as charge carrier generation sites, are also vital for obtaining active or superior response of newly designed photocatalysts [Banerjee S, et. al., J Phys Chem Lett, 2014, 5, 2543-54].

Semiconductor based photocatalysts, particularly semiconducting metal oxides such as titania and zinc oxide have been considered advantageous for low toxicity, excellent photocatalytic performance, simplicity and cost effective synthesis procedures. However, metal oxides such as ZnO are impractical due to wide band gaps, typically lying in the ultraviolet region of the spectrum. The creation of coupled photocatalysts or heterojunctions may increase the efficiency and performance of such a composite photocatalyst. Non-semiconductor components of such a composite may improve the absorption energy requirements, lengthen the charge separation time, and/or facilitate charge separation or transfer to a catalytically active component.

Accordingly it is one objective of the present disclosure to provide a nanocomposite photocatalyst comprising materials which may be useful for overcoming the limitations and disadvantages discussed above. Such a nanocomposite photocatalyst may be useful in the degradation or destruction of organic pollutants.

SUMMARY OF THE INVENTION

The present disclosure relates to a nanocomposite photocatalyst, comprising 1 to 12.5 wt % a carbon nanomaterial comprising amorphous carbon and graphitic carbon, 82.5 to 98.9 wt % metal oxide nanoparticles disposed on the carbon nanomaterial, and 0.1 to 5 wt % noble metal nanoparticles disposed on the metal oxide nanoparticles and/or the carbon nanomaterial, each based on a total weight of nanocomposite photocatalyst.

In some embodiments, the carbon nanomaterial is present in the form of sheets having a mean thickness of 50 to 500 nm and a mean width of 500 to 5000 nm.

In some embodiments, the metal oxide nanoparticles comprise a metal oxide which is at least one selected from the group consisting of zinc oxide, zirconium oxide, titanium dioxide, iron oxide, aluminum oxide, molybdenum oxide, cerium oxide, and copper oxide.

In some embodiments, the metal oxide is zinc oxide.

In some embodiments, the metal oxide nanoparticles are crystalline by PXRD, and have a mean particle size of 10 to 100 nm.

In some embodiments, the metal oxide nanoparticles are zinc oxide and adopt the wurtzite (also known as hexagonal) crystal structure.

In some embodiments, the noble metal nanoparticles are gold nanoparticles.

In some embodiments, the noble metal nanoparticles have a mean particle size of 1 to 15 nm.

In some embodiments, the nanocomposite photocatalyst has a mean surface area of 5 to 10.5 m$^2$/g, a mean pore size of 5 to 20 nm, and a mean pore volume of 0.010 to 0.035 cm$^3$/g, In some embodiments, the carbon nanomaterial is present in the form of nanosheets having a mean thickness of 50 to 500 nm and a mean width of 500 to 5000 nm;

the metal oxide nanoparticles comprise a metal oxide which is zinc oxide with a wurtzite crystal structure which are crystalline by PXRD and have a mean particle size of 10 to 100 nm; and the noble metal nanoparticles are gold nanoparticles having a mean particle size of 1 to 15 nm.

The present disclosure also relates to a method of forming the nanocomposite photocatalyst, the method comprising mixing metal oxide nanoparticles and a noble metal source in a first solvent to form a first mixture, irradiating the first mixture with ultraviolet light at an intensity of 0.25 to 5 mW/cm² to form a first product, optionally isolating the first product, ultrasonically treating an organic carbon source and an alcohol to form a second mixture, pyrolyzing the second mixture at 400 to 600° C. to form the carbon nanomaterial, ultrasonically treating a third mixture comprising the first product, the carbon nanomaterial, and water to form the nanocomposite photocatalyst, and optionally isolating the nanocomposite photocatalyst.

In some embodiments, the metal oxide nanoparticles are nanoparticles of a metal oxide which is at least one selected from the group consisting of zinc oxide, zirconium oxide, titanium dioxide, iron oxide, aluminum oxide, molybdenum oxide, cerium oxide, and copper oxide.

In some embodiments, the metal oxide is zinc oxide.

In some embodiments, the pyrolyzing is performed for 1 to 6 hours and under inert atmosphere.

In some embodiments, the noble metal source is chloroauric acid or a salt thereof.

In some embodiments, the organic carbon source is date seeds.

The present disclosure also relates to a method of photodegrading an organic pollutant, the method comprising irradiating a photodegradation mixture comprising the organic pollutant, the nanocomposite photocatalyst, and water with visible light.

In some embodiments, the irradiating is performed with an irradiation intensity of 0.5 to 5 W/mL of photodegradation mixture.

In some embodiments, the nanocomposite photocatalyst is present in the photodegradation mixture in an amount of 0.01 to 0.125 g/L.

In some embodiments, the pharmaceutical compound is gemifloxacin and the method degrades greater than 90% of an initial amount of organic pollutant after 17.5 to 37.5 minutes.

BRIEF DESCRIPTION OF THE DRAWINGS

FIGS. 4A-4D show FESEM images of Undoped ZnO (FIG. 4A), AC (FIG. 4B), Au/ZnO (FIG. 4C), and AC@Au/ZnO (FIG. 4D).

FIG. 4E shows a plot of EDS elemental analysis of the nanocomposite photocatalyst.

FIGS. 5A-5D are TEM images of ZnO (FIG. 5A), AC (FIG. 5B), Au/ZnO (FIG. 5C), AC@Au/ZnO (FIG. 5D) nanocomposite photocatalysts.

FIG. 5E is an HR-TEM image of ZnO.

FIG. 5F shows a selected area electron diffraction pattern of AC@Au/ZnO.

FIG. 6A shows a wide-scan survey spectrum, FIG. 6B shows a high-resolution scan spectrum of the Au4f region, FIG. 6C shows a high-resolution scan spectrum of the Zn2p region, FIG. 6D shows a high-resolution scan spectrum of the C1s region, and FIG. 6E shows a high-resolution scan spectrum of the O1s region.

DETAILED DESCRIPTION OF THE INVENTION

Figure 1A:
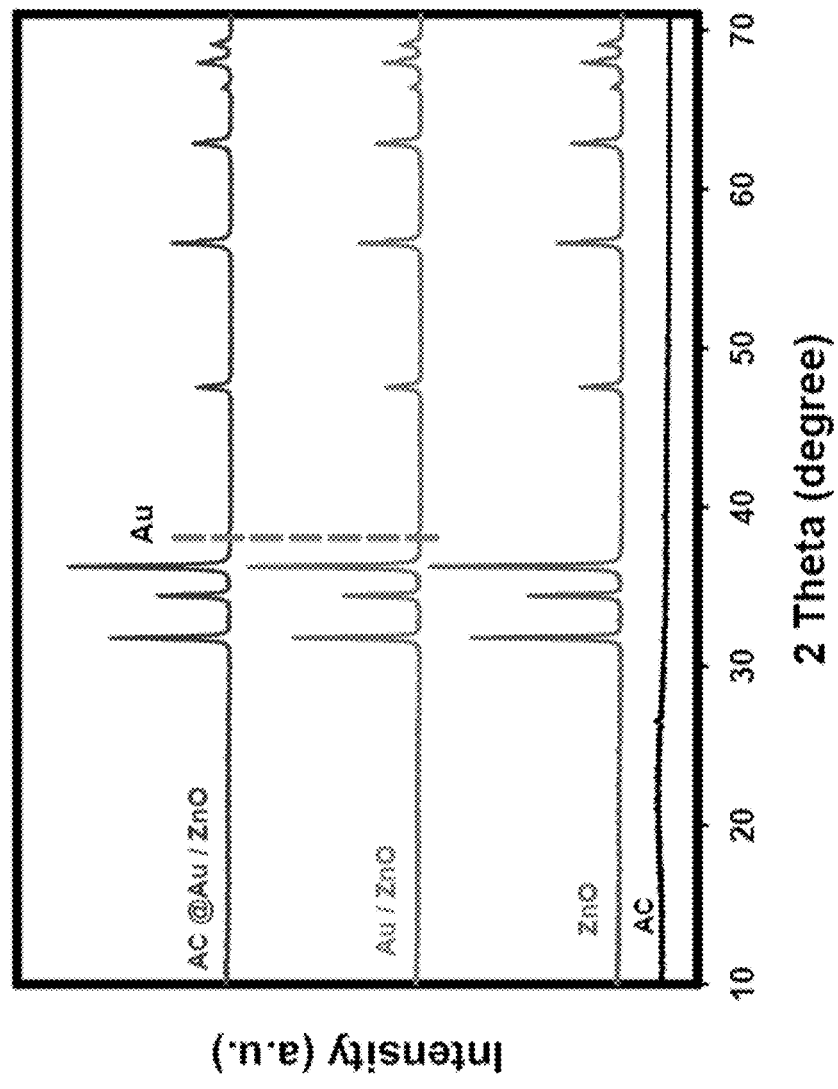
FIG. 1A shows PXRD patterns of AC, ZnO, Au/ZnO, and AC@Au/ZnO nanocomposite photocatalysts according to an embodiment.

In the following description, it is understood that other embodiments may be utilized and structural and operational changes may be made without departure from the scope of the present embodiments disclosed herein.

Definitions

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

As used herein, the term "agglomerates" refers to a clustered particulate composition comprising primary particles, the primary particles being aggregated together in such a way so as to form clusters thereof, at least 50 volume percent of the clusters having a mean size that is at least 2 times the mean size of the primary particles, and preferably at least 90 volume percent of the clusters having a mean size that is at least 5 times the mean size of the primary particles.

As used herein, the term "noble metal" refers to a metallic element selected from the group consisting of gold, platinum, palladium, ruthenium, rhodium, osmium, and iridium. The term does not include metals such as silver, copper, mercury, and rhenium.

Nanocomposite Photocatalyst

According to a first aspect, the present disclosure relates to a nanocomposite photocatalyst, comprising 1 to 12.5 wt %, preferably 1.5 to 10 wt %, preferably 2 to 9 wt %, preferably 2.5 to 8 wt %, preferably 3 to 7 wt %, preferably 3.5 to 6.5 wt %, preferably 4 to 6 wt %, preferably 4.25 to 5.75 wt %, preferably 4.5 to 5.5 wt %, preferably 4.75 to 5.25 wt %, preferably 4.9 to 5.1 wt %, preferably 5 wt % a carbon nanomaterial comprising amorphous carbon and graphitic carbon, 82.5 to 98.9 wt %, preferably 85 to 98 wt %, preferably 87.5 to 97.5 wt %, preferably 91 to 97 wt %, preferably 92 to 96 wt %, preferably 93 to 95 wt %, preferably 93.5 to 94.5 wt %, preferably 94 wt % metal oxide nanoparticles disposed on the carbon nanomaterial, and 0.1 to 5 wt %, preferably 0.25 to 4 wt %, preferably 0.4 to 3 wt %, preferably 0.5 to 2.5 wt %, preferably 0.6 to 2.0 wt %, preferably 0.75 to 1.5 wt %, preferably 0.9 to 1.25 wt %, preferably 1.0 wt % noble metal nanoparticles disposed on the metal oxide nanoparticles and/or the carbon nanomaterial, each based on a total weight of nanocomposite photocatalyst.

In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon nanomaterial is at least one selected from the group consisting of graphene, graphene oxide, reduced graphene oxide, carbon nanotubes, carbon dots, and activated carbon.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanoparticles are activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanoparticles are carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In alternative embodiments, mixtures of types of particles are used.

In some embodiments, the carbon nanomaterial is present in the form of sheets having a mean thickness of 50 to 500 nm, preferably 60 to 475 nm, preferably 75 to 450 nm, preferably 100 to 425 nm, preferably 110 to 400 nm, preferably 125 to 375 nm, preferably 150 to 350 nm and a mean width of 500 to 5000 nm, preferably 550 to 4750 nm, preferably 600 to 4500 nm, preferably 650 to 4250 nm, preferably 700 to 4000 nm, preferably 750 to 3900 nm, preferably 800 to 3800 nm, preferably 850 to 3700 nm, preferably 900 to 3600 nm, preferably 950 to 3500 nm, preferably 1000 to 3400 nm.

In some embodiments, the sheets have a monodisperse thickness, having a coefficient of variation or relative standard deviation, expressed as a percentage and defined as the ratio of the sheet thickness standard deviation ($\sigma$) to the sheet thickness mean ($\mu$), multiplied by 100%, of less than 25%, preferably less than 10%, preferably less than 8%, preferably less than 6%, preferably less than 5%. In a preferred embodiment, the sheets have a monodisperse thickness, having a size distribution ranging from 80% of the average thickness to 120% of the average thickness, preferably 85 to 115%, preferably 90 to 110% of the average thickness. In another embodiment, the sheets do not have a monodisperse thickness. In some embodiments, the sheets have a monodisperse diameter, having a coefficient of variation or relative standard deviation, expressed as a percentage and defined as the ratio of the sheet diameter standard deviation ($\sigma$) to the sheet diameter mean ($\mu$), multiplied by 100%, of less than 25%, preferably less than 10%, preferably less than 8%, preferably less than 6%, preferably less than 5%. In a preferred embodiment, the sheets have a monodisperse diameter, having a size distribution ranging from 80% of the average diameter to 120% of the average diameter, preferably 85 to 115%, preferably 90 to 110% of the average diameter. In another embodiment, the sheets do not have a monodisperse diameter.

The carbon nanomaterial comprises amorphous carbon and graphitic carbon. In some embodiments, the presence of amorphous carbon and graphitic carbon is determined by Raman spectroscopy. That is, the carbon nanomaterial exhibits signals in a Raman spectrum which correspond to amorphous carbon and graphitic carbon. Amorphous carbon may have a signal in a Raman spectrum centered at approximately 1300 to 1400 $cm^{-1}$, or 1310 to 1390 $cm^{-1}$, or 1320 to 1380 $cm^{-1}$, or 1330 to 1370 $cm^{-1}$, or 1340 to 1360 $cm^{-1}$, or 1350 $cm^{-1}$. Such a signal may be referred to as a "D-band". Graphitic carbon may have a signal in a Raman spectrum centered at approximately 1480 to 1680 $cm^{-1}$, or 1500 to 1660 $cm^{-1}$, or 1520 to 1640 $cm^{-1}$, or 1540 to 1620 $cm^{-1}$. Such a signal may be referred to as a "G-band". In some embodiments, the carbon nanomaterial has a Raman spectrum showing a D-band and a G-band having an intensity ratio ($I_D/I_G$) of 0.5:1 to 1.1:1, preferably 0.6:1 to 1:1, preferably 0.7:1 to 0.9:1, preferably 0.75:1 to 0.85:10. In some embodiments, the carbon nanomaterial has a ratio of amorphous carbon to graphitic carbon of 0.25:1 to 1.5:1, preferably 0.5:1 to 1.1:1, preferably 0.6:1 to 1:1, preferably 0.7:1 to 0.9:1, preferably 0.75:1 to 0.85:10. In some embodiments, the ratio of amorphous carbon to graphitic carbon is a weight ratio. In some embodiments, the ratio of amorphous carbon to graphitic carbon is a mole ratio.

In some embodiments, the metal oxide is at least one selected from the group consisting of zinc oxide, zirconium oxide, titanium dioxide, iron oxide, aluminum oxide, molybdenum oxide, cerium oxide, and copper oxide. In some embodiments, the metal oxide is zinc oxide.

In general, the metal oxide nanoparticles can be any shape known to one of ordinary skill in the art. Examples of suitable shapes the metal oxide nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For metal oxide nanoparticles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the metal oxide nanoparticles are envisioned as having in any embodiments.

In some embodiments, the metal oxide nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of metal oxide nanoparticles having a different shape. As used herein, the term "non-uniform shape" refers to an average consistent shape that differs by more than 10% of the distribution of metal oxide nanoparticles having a different shape. In one embodiment, the shape is uniform and at least 90% of the metal oxide nanoparticles are spherical or substantially circular, and less than 10% are polygonal. In another embodiment, the shape is non-uniform and less than 90% of the metal oxide nanoparticles are spherical or substantially circular, and greater than 10% are polygonal.

In some embodiments, the metal oxide nanoparticles have a mean particle size of 10 to 100 nm, preferably 15 to 90 nm, preferably 20 to 80 nm, preferably 25 to 75 nm, preferably 30 to 70 nm, preferably 35 to 65 nm, preferably 40 to 60 nm, preferably 42.5 to 57.5 nm, preferably 45 to 55 nm, preferably 47.5 to 52.5 nm, preferably 49 to 51 nm, preferably 50 nm. In embodiments where the metal oxide nanoparticles are spherical, the particle size may refer to a particle diameter. In embodiments where the metal oxide nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the metal oxide nanoparticles have an anisotropic shape such as nanorods, the particle size may refer to a length of the nanorod, a width of the nanorod, an average of the length and width of the nanorod. In some embodiments in which the metal oxide nanoparticles have non-spherical shapes, the particle size refers to the diameter of a sphere having an equivalent volume as the particle. In some embodiments in which the metal oxide nanoparticles have non-spherical shapes, the particle size refers to the diameter of a sphere having an equivalent diffusion coefficient as the particle.

In some embodiments, the metal oxide nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the metal oxide nanoparticles of the present disclosure are monodisperse having a particle size distribution ranging from 80% of the average particle size to 120% of the average particle size, preferably 90-110%, preferably 95-105% of the average particle size. In some embodiments, the metal oxide nanoparticles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In some embodiments, the metal oxide nanoparticles are crystalline by PXRD. In some embodiments, the metal oxide nanoparticles are crystalline by high resolution transmission electron microscopy (HR-TEM). In HR-TEM, crystallinity can be confirmed by the presence of lattice fringes. In some embodiments, the metal oxide nanoparticles are crystalline by electron diffraction. In some embodiments, the metal oxide nanoparticles are not crystalline. In some embodiments, the metal oxide nanoparticles comprise nanoparticles which are crystalline and nanoparticles which are not crystalline.

In some embodiments, the metal oxide nanoparticles are zinc oxide and crystallize in the wurtzite crystal structure. The wurtzite crystal structure is a hexagonal crystal structure typical of binary materials. In some embodiments, the metal oxide nanoparticles are zinc oxide and a portion crystallize in the wurtzite crystal structure and a portion crystallize in the zincblende (also known as cubic or sphalerite) crystal structure. In some embodiments, metal oxide nanoparticles are zinc oxide and are substantially free of particles which crystallize in the zincblende crystal structure.

In some embodiments, the noble metal nanoparticles are gold nanoparticles. In some embodiments, the noble metal nanoparticles have a mean particle size of 1 to 15 nm, preferably 2 to 12.5 nm, preferably 3 to 11 nm, preferably 4 to 10 nm, preferably 4.5 to 9.5 nm, preferably 5 to 9 nm, preferably 5.5 to 8.5 nm, preferably 6 to 8 nm, preferably 6.5 to 7.5 nm, preferably 7 nm. In general, the noble metal nanoparticles can be any shape known to one of ordinary skill in the art as described above. The noble metal nanoparticles may be monodisperse or may not be monodisperse. In some embodiments, the noble metal nanoparticles may be crystalline. The crystallinity may be determined by any suitable technique as described above, such as PXRD, electron diffraction, or HR-TEM. In some embodiments, the noble metal nanoparticles are crystalline by PXRD.

In some embodiments, the nanocomposite photocatalyst has a mean surface area of 5 to 10.5 $m^2/g$, preferably 5.25 to 10.25 $m^2/g$, preferably 5.5 to 10 $m^2/g$, preferably 5.75 to 9.75 $m^2/g$, preferably 6.0 to 9.5 $m^2/g$, preferably 6.25 to 9.25 $m^2/g$, preferably 6.50 to 9.0 $m^2/g$, preferably 6.75 to 8.75 $m^2/g$, preferably 7.0 to 8.5 $m^2/g$, preferably 7.25 to 8.25 $m^2/g$, preferably 7.5 to 8.1 $m^2/g$, preferably 7.6 to 8.0 $m^2/g$, preferably 7.75 to 7.90 $m^2/g$, preferably 7.80 to 7.85 $m^2/g$, preferably 7.83 $m^2/g$.

In some embodiments, the nanocomposite photocatalyst has a mean pore size of 5 to 20 nm, preferably 6 to 18 nm, preferably 7 to 16 nm, preferably 8 to 15 nm, preferably 9 to 14 nm, preferably 9.5 to 13 nm, preferably 10 to 12.5 nm, preferably 10.25 to 12 nm, preferably 10.5 to 11.75 nm, preferably 10.75 to 11.5 nm, preferably 11.0 to 11.25 nm.

In some embodiments, the nanocomposite photocatalyst has a mean pore volume of 0.010 to 0.035 $cm^3/g$, preferably 0.0125 to 0.0325 $cm^3/g$, preferably 0.015 to 0.030 $cm^3/g$, preferably 0.0175 to 0.0275 $cm^3/g$, preferably 0.020 to 0.025 $cm^3/g$, preferably 0.022 $cm^3/g$.

In some embodiments, the nanocomposite photocatalyst has a band gap of 2.80 to 3.05 eV, preferably 2.825 to 3.00 eV, preferably 2.84 to 2.95 eV, preferably 2.85 to 2.90 eV, preferably 2.86 to 2.88 eV, preferably 2.87 eV.

Method of Forming the Nanocomposite Photocatalyst

The present disclosure also relates to a method of forming the nanocomposite photocatalyst, the method comprising mixing metal oxide nanoparticles and a noble metal source in a first solvent to form a first mixture, irradiating the first mixture with ultraviolet light at an intensity of 0.25 to 5 $mW/cm^2$, preferably 0.5 to 4.5 $mW/cm^2$, preferably 0.75 to 4 $mW/cm^2$, preferably 1 to 3.5 $mW/cm^2$, preferably 1.25 to 3 $mW/cm^2$, preferably 1.5 to 2.5 $mW/cm^2$, preferably 1.75 to 2.25 $mW/cm^2$, preferably 2.0 $mW/cm^2$ to form a first product, optionally isolating the first product, ultrasonically treating an organic carbon source and an alcohol to form a second mixture, pyrolyzing the second mixture at 400 to 600° C., preferably 425 to 575° C., preferably 450 to 550° C., preferably 475 to 525° C., preferably 490 to 510° C., preferably 500° C., to form the carbon nanomaterial, In some embodiments, the metal oxide nanoparticles are nanoparticles of a metal oxide which is at least one selected from the group consisting of zinc oxide, zirconium oxide, titanium dioxide, iron oxide, aluminum oxide, molybdenum oxide, cerium oxide, and copper oxide. In some embodiments, the metal oxide is zinc oxide. The metal oxide nanoparticles may be as described above. In some embodiments, the metal oxide is zinc oxide and the zinc oxide nanoparticles are formed by hydrothermally treating a zinc oxide synthesis mixture comprising a zinc source, urea, a base, and water at 100 to 200° C., preferably 125 to 175° C., preferably 150° C. In some embodiments, the zinc source is at least one selected from the group consisting of zinc acetate, zinc nitrate, zinc chloride, zinc bromide, zinc iodide, zinc formate, zinc acetylacetonate, and zinc sulfate. In some embodiments, the zinc source is zinc chloride. In some embodiments, the base is a hydroxide base. In some embodiments, the base is ammonium hydroxide. In some embodiments, the base is added in an amount sufficient to adjust the pH of the zinc oxide synthesis mixture to 9.5 to 11, preferably 9.75 to 10.75, preferably 10 to 10.5, preferably 10.1 to 10.4, preferably 10.2.

In some embodiments, the noble metal source is a gold salt. Examples of gold salts include, but are not limited to, chloroauric acid and salts thereof, gold chloride, tetrabromoauric acid and salts thereof, gold bromide, gold iodide, and nitroauric acid and salts thereof. In some embodiments, the noble metal source is chloroauric acid or a salt thereof.

In some embodiments, the first solvent comprises water. In some embodiments, the first solvent comprises an alcohol having 5 or fewer carbon atoms. Examples of such alcohols include methanol, ethanol, n-propanol, 2-propanol, n-butanol, 2-butanol, and n-pentanol. In some embodiments, the alcohol having 5 or fewer carbon atoms is present in an amount of 0.5 to 5 vol %, preferably 0.75 to 2.5 vol %, preferably 1 vol %, based on a total volume of first solvent. In such embodiments, the balance may be water.

In some embodiments, the irradiating is performed for 1 to 24 hours, preferably 2 to 22 hours, hours, preferably 3 to 20 hours, preferably 4 to 19 hours, preferably 5 to 18 hours, preferably 6 to 18 hours, preferably 7 to 17 hours, preferably 8 to 16 hours, preferably 9 to 15 hours, preferably 10 to 14 hours, preferably 11 to 13 hours, preferably 12 hours. In some embodiments, the intensity of the irradiating is measured at 300 to 400 nm, preferably 310 to 390 nm, preferably 320 to 380 nm, preferably 330 to 370 nm, preferably 340 to 360 nm, preferably 350 nm. In some embodiments, the irradiating is performed using a mercury lamp.

In general, the organic carbon source can be any suitable organic carbon source known to one of ordinary skill in the art. In some embodiments, the organic carbon source is a plant material. In general, any part or combination of parts of a plant may be used in in the current invention. For example, the organic carbon source may be made using whole plants, roots, stems, leaves, flowers, bark, bulbs, fruits, seeds, buds, or any combination thereof.

In some embodiments the organic carbon source is date seeds. In some embodiments, the date seeds may be dried prior to use in the method. In some embodiments, the date seeds may be reduced to smaller particles prior to use in the method. Such a reduction to smaller particles may be performed by any suitable technique or with any suitable equipment known to one of ordinary skill in the art. Examples of such techniques include, but are not limited to, milling, grinding, ball milling, chopping, pulverizing, crushing, pounding, mincing, shredding, smashing, and fragmenting. In some embodiments, the milling may take place using a mill, ball mill, rod mill, autogenous mill, cutting mill, semi-autogenous grinding mill, pebble mill, buhrstone mill, burr mill, tower mill, vertical shaft impactor mill, a low energy milling machine, grinder, pulverizer, mortar and pestle, blender, crusher, or other implement used to reduce a material to small particles.

The alcohol may be any suitable alcohol having 5 or fewer carbon atoms as described above. In preferred embodiments, the alcohol is ethanol.

In some embodiments, the pyrolyzing is performed for 1 to 6 hours and under inert atmosphere. Such an inert atmosphere may be provided by any suitable gas, such as nitrogen, argon, neon, and helium.

Method of Photodegrading an Organic Pollutant

The present disclosure also relates to a method for of photodegrading an organic pollutant in water using the nanocomposite photocatalyst described above. In some embodiments, only one organic pollutant is present in the water. In alternative embodiments, a plurality of organic pollutants is present in the water. The method involves irradiating a photodegradation mixture comprising the organic pollutant, the nanocomposite photocatalyst, and water with visible light.

In some embodiments, the organic pollutants may be a dye, a phenol, a polycyclic aromatic hydrocarbon, an herbicide, a pesticide, a persistent organic pollutant a pharmaceutical compound, or the like.

In some embodiments, the organic pollutant is a pharmaceutical compound. Examples of pharmaceutical compounds include, but are not limited to fluticasone propionate, clonidine, triazolam, albuterol, ciclesonide, fentanyl, terbutaline, flumazenil, triamcinolone acetonide, flunisolide, ropinirole, alprazolam, buprenorphine, hyoscyamine, atropine, pramipexole, bumetanide, flunitrazepam, oxymorphone, colchicine, apomorphine HCI, granisetron, pergolide, nicotine, loperamide, azatadine, naratriptan, clemastine, benztropine, ibutilide, butorphanol, fluphenazine, estradiol-17-heptanoate, zolmitriptan, metaproterenol, scopolamine, diazepam, tolterodine, estazolam, haloperidol, carbinoxamine, estradiol, hydromorphone, bromazepam, perphenazine, midazolam, methadone, frovatriptan, eletriptan, testosterone, melatonin, galanthamine, cyproheptadine, bropheniramine, chlorpheniramine, ibuprofen, carbamazepine, atenolol, mefenamic acid, fluconazole, indomethacin, propranolol, ifenprodil, finofibric acid, fluoxetine, and trimethoprim.

In some embodiments, the organic pollutant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefinetazole, cefonicid, cefprozil, cefiroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapipro-lin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetranat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

The method comprises irradiating a photodegradation mixture comprising the organic pollutant, the nanocomposite photocatalyst, and water with visible light.

In some embodiments, the irradiating is performed with an irradiation intensity of 0.5 to 5 W/mL, preferably 0.75 to 4.5 mW/mL, preferably 1 to 4.0 mW/mL, preferably 1.25 to 3.75 mW/mL, preferably 1.5 to 3.5 mW/mL preferably 1.75 to 3.25 mW/mL preferably 2.0 to 3.0 mW/mL, preferably 2.25 to 2.75 mW/mL, preferably 2.4 to 2.6 mW/mL, preferably 2.5 mW/mL of photodegradation mixture.

In general, the irradiation with visible light may be performed by any suitable technique and/or with any suitable equipment (e.g. visible light source) known to one of ordinary skill in the art. In some embodiments, the visible light source is the sun. In some embodiments, the visible light source is an artificial light source. Examples of artificial light sources include, but are not limited to an incandescent lamp, an argon flash lamp, a carbide lamp, gas lighting, a kerosene lamp, an oil lamp, an arc lamp, a flashtube, a gas discharge lamp, an electrodeless lamp, an excimer lamp, a fluorescent lamp, a carbon arc lamp, a ceramic discharge metal-halide lamp, a mercury-vapor lamp, a sodium-vapor lamp, a xenon arc lamp, a neon lamp, a plasma lamp, an LED, a light-emitting electrochemical cell, an electroluminescent material, a laser including, but not limited to chemical, dye, free-electron, gas, ion, diode, metal-vapor, quantum well, ruby, and solid-state type lasers, and a deuterium arc lamp. In some embodiments, a single type of light source is used. In alternative embodiments, more than one type of light source is used. In some embodiments, the light source has a light output comprising visible light and a significant percentage (i.e. at least 5%, preferably at least 10% of a total energy output) of at least one selected from the group consisting of UV light and infrared light.

In some embodiments, the nanocomposite photocatalyst is present in the photodegradation mixture in an amount of 0.01 to 0.125 g/L, preferably 0.02 to 0.1 g/L, preferably 0.03 to 0.09 g/L, preferably 0.04 to 0.08 g/L, preferably 0.045 to 0.075 g/L, preferably 0.05 to 0.07 g/L, preferably 0.0525 to 0.0675 g/L, preferably 0.055 to 0.065 g/L, preferably 0.0575 to 0.0625 g/L, preferably 0.06 g/L.

In some embodiments, the organic pollutant is a pharmaceutical compound having a pyrrolidinyl substituted fused ring heterocycle. In some embodiments, the pharmaceutical compound having a pyrrolidinyl substituted fused ring heterocycle is gemifloxacin. In some embodiments, the organic pollutant is gemifloxacin and the method degrades greater than 90%, preferably greater than 90.5%, preferably greater than 91%, preferably greater than 91.5%, preferably greater than 92%, preferably greater than 92.5%, preferably greater than 93%, preferably greater than 93.5%, preferably greater than 94%, preferably greater than 94.5%, preferably greater than 95%, preferably greater than 95.5%, preferably greater than 96%, preferably greater than 96.5%, preferably greater than 97%, preferably greater than 97.5%, preferably greater than 98%, preferably greater than 98.5%, preferably greater than 99%, preferably greater than 99.5% of an initial amount of organic pollutant after 17.5 to 37.5 minutes, preferably 20 to 35 minutes, preferably 22.5 to 32.5 minutes, preferably 25 to 30 minutes.

As used herein, the term "degrading" an organic pollutant refers to chemically treating the organic pollutant with one or more reactive species such that the organic pollutant is transformed into a degraded structure which is not considered an organic pollutant. The degrading may involve breaking down the pollutant into atoms, ions, and/or smaller molecules (e.g., nitrogen gas, carbon dioxide, and water). For example, degradation of the pollutant can include breaking existing covalent chemical bonds in the pollutant so as to change the physical and/or chemical properties of the pollutant. Such a degraded structure may be non-toxic, of little to no environmental concern, or easily utilized, destroyed, or otherwise remediated by natural processes. The degrading may involve chemical processes such as breaking of chemical bonds, particularly C—C bonds, C—N bonds, C—O bonds, C—H bonds, N—N bonds or combinations thereof. The preceding description of bonds refers only to the constituent atoms and not to the nature of the bond. For example, such bonds may be single bonds, double bonds, triple bonds, or any intermediate bond order. The degrading may involve oxidation or reduction of organic pollutants or certain functional groups present in the organic pollutants. Degradation which involves irradiation with light may be referred to as "photodegradation".

In general, the method may be performed as a batch process or a continuous process. In some embodiments, the method involves stirring or agitation. Such stirring or agitation may be performed using any suitable technique or with any suitable equipment (e.g. magnetic stirrer, mechanical stirrer, ultrasonic mixer, etc.) known to one of ordinary skill in the art. The nanocomposite photocatalyst may be formed into any suitable shape for use in the method. For example, the nanocomposite photocatalyst may be free flowing in the photodegradation mixture. That is, the nanocomposite photocatalyst may be dispersed, suspended, or otherwise present as particles in the photodegradation mixture. The nanocomposite photocatalyst may be present on a support. In such embodiments, the photodegradation solution may be flowed over or otherwise contacted with the nanocomposite photocatalyst present on the support.

In some embodiments, the nanocomposite photocatalyst is recovered after the method is performed. Such recovery may be performed by any suitable technique known to one of ordinary skill in the art for separating solids and liquids. Examples of such suitable techniques include, but are not limited to decantation, centrifugation, and filtration, but excluding techniques such as evaporation and distillation.

The examples below are intended to further illustrate protocols for preparing and characterizing the nanocomposite photocatalyst, as well as performing the method, and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

Examples

Materials

Zinc chloride (≥98% purity), urea (99% purity), ammonium hydroxide (30% $NH_3$ basis), $HAuCl_4 \cdot 4H_2O$ (99% purity), gemifloxacin mesylate (≥98% purity), methylene blue dye (Dye content >82%), ethanol (≥99.8% purity), methanol (99.9% purity), isopropanol (99.5% purity) were supplied by Sigma-Aldrich and utilized as received without further processing.

Synthesis of ZnO

ZnO nanostructures were synthesized utilizing the hydrothermal technique. Briefly, 1.36 g of $ZnCl_2$ and 2.4 g urea were homogeneously dissolved in 100 mL double distilled water with continuous 30 min stirring at room temperature. The pH of prepared solution was adjusted to 10.20 by adding $NH_4OH$. The resulting solutions were then put into autoclave (Teflon lined), followed by heating in an oven to 150° C. for 12 h. Obtained white compound was then allowed to cool at room temperature. The resulting product was then washed several times with water (double distilled) and ethanol and allowed to dry under natural conditions. Finally, the resulting compound was calcined at 500° C. for 3 h.

Preparation of Au/ZnO Nanocomposites $Au^{3+}$ ions were successfully decorated onto the hydrothermally prepared ZnO compound by applying photochemical reduction methodology to produce Au doped ZnO (actual composition 1 wt. % of Au doped ZnO) framework as follows: Briefly, the newly prepared ZnO (1.0 g) was added to 100 mL water and methanol (1% (v/v) methanol/ $H_2O$ ratio) and the suspension was sonicated for 10 min. A required volume of 0.254 M solution of $HAuCl_4 \cdot 4H_2O$ in water was then gently poured to the prepared suspension. The resulting mixture was exposed to UV (A) light of Philips mercury standard lamp for 12 h (illumination power intensity: 2.0 mW $cm^{-2}$ at 350 nm). The as prepared Au/ZnO nanocomposites were separated by centrifugation and drained several times with $H_2O$ and $C_2H_5OH$, then dried at 110° C. for 12 h to obtain Au doped ZnO nanocomposites.

Preparation of Activated Carbon (AC)

Date seeds were collected, carefully washed with water and thoroughly dried. Crushing of dried seeds was then conducted in an electrical grinder and sieved to produce a fine powder.

Appropriate sonication of as-obtained powder was carried out in ethanol for 30 min followed by evaporation of ethanol at 50° C. for 24 h. Finally, heat treatment for the powder was performed at a pyrolysis temperature 500° C. for 3 h, with a heating rate 10° C./min under nitrogen gas.

Preparation of AC@Au/ZnO Nanocomposites

AC@Au/ZnO ternary framework was prepared by applying ultra-sonication methodology. Typically, 0.5 g of 1% Au/ZnO and 0.025 g AC were combined together in 100 mL of double distilled water followed by ultra-sonication for 30 min for the formation of AC@Au/ZnO. The resulting mixture was then separated out by filtration with careful washing (4-5 times) by distilled water and ethanol to remove any kind of attached impurity, and then dried for 24 h (at 65° C.) in oven to acquired final product i.e. AC@Au/ZnO nanocomposites (actual composition 5% AC/1% Au/ZnO).

Material Characterization

The X-ray diffraction (XRD) investigation was conducted with Cu $K\alpha_{1/2}$, $\lambda_{\alpha 1}$=154.060 pm, $\lambda_{\alpha 2}$=154.439 pm radiation on Bruker diffractometer (AXS D4 Endeavor X). Surface related morphological features and related chemical analysis were carried out utilizing (JSM-7600F, Japan) field emission scanning electron microscope and (JEOL JEM-2100F-UHR model field-emission instrument i.e. Transmission electron microscope) equipped with Gatan GIF 2001 energy filter along with a distinctive camera (1 k-CCD) to generate EEL spectra functioning at 200 kV. Fourier transforms infrared spectroscopy in KBr dispersion mode was conducted on PerkinElmer Raman Station model 400 in the range of 400-4000 $cm^{-1}$. The X-ray photoelectron spectroscopy (XPS) was conducted on MgKα spectrometer (JEOL, JPS 9200) with an excitation radiation source (MgKα, pass energy=50.0 eV (wide scan) and 30 eV (narrow scan), voltage=10 kV, current=20 mA). The photoluminescence (PL) spectral analysis was carried out on Fluorescence spectrophotometer (Hitachi model: F-7000). The PL intensities of all samples were examined at excitation wavelength: 350 nm under xenon lamp. Diffuse reflectance spectra were obtained on Lambda 950 model of PerkinElmer spectrophotometer in the range of 200-800 nm for all synthesized nanostructures. Calculated Kubelka-Munk function $[F(R) \; E]^2$ values vs. the data of absorbed light energy E plot was then taken into consideration to calculate the band gap energy ($E_g$) considering the below mentioned equation:

$$F(R)E^2 = \left( \frac{(1-R)^2}{2R} \times h\nu \right)^2$$

Photocatalytic Experiments

The photocatalytic experiments of bare ZnO, Au doped ZnO and AC@Au/ZnO ternary framework were conducted on gemifloxacin drug as a target moiety under visible light energy source. 100 mL of 20 ppm solution of gemifloxacin drug (in double-distilled water) was utilized for each reaction. All photocatalytic reactions were performed in an immersion well reaction vessel (150 mL) of quartz glass (supplied by Lelesil innovative system: India) fitted on magnetic stirrer. The photo-reactor assembly was equipped with a water circulating system to avoid any heating during the photocatalytic treatment. Continuous supply of air was also maintained through the vent in the photoreactor. Typically, in every experiment, 0.06 g/L of designed photocatalysts was transferred to the gemifloxacin drug solution. Obtained heterogeneous mixture was kept in dark for 30 min with continuous stirring and air bubbling to sustain system equilibration in order to isolate the role of adsorption process in removal of target pollutant. A 250 W visible lamp was utilized as a source of irradiation for all experiments. 5 mL of illuminated samples were collected at proper time intervals followed by centrifugation for appropriate separation of photocatalyst from drug solution. Absorbance value of each irradiated sample at λ=269 nm was measured to check the efficacy of developed photocatalysts. The efficacy or photocatalytic performance of newly fabricated photocatalyst was determined using the following equation:

$$\% \text{ Photocatalytic Activity} = \frac{C_0 - C_t}{C_0} \times 100$$

where $C_0$ represents the equilibrium concentration and $C_t$ represents the concentration at a particular irradiation time t. For every experiment, the photo degradation rate constant (k) was derived from the primary slope attained from natural logarithm (ln) of absorbance vs. irradiation time plot by linear regression means i.e., first-order degradation kinetics [Xue J, et. al. RSC Adv, 2015, 5, 18832-40].

Photo-Electrochemical Experiments

To explore the photo-electrochemical performance of newly synthesized photocatalysts, an electrode was prepared according to the following. Briefly, 10 mg of newly synthesized photocatalyst was homogeneously mixed in 900 mL of isopropanol and 100 mL of Nafion to get a uniform suspension. From this suspension, 4 mL volume was carefully placed as uniform layered to previously cleaned glassy carbon (GC) electrode and finally dried for 30 min at 60° C. The electrochemical investigation was performed on a three electrode-based electrochemical workstation (Zahner Zennium, Germany). Ag/AgCl electrode saturated with KCl was utilized as a reference and Pt wire as a counter electrode.

Moreover, for all experiments, 0.1 M $Na_2SO_4$ solution was used as an electrolyte. A 400 W (visible light) GE lamp was the irradiation source to examine the photo responsive behavior of the electrodes fabricated with synthesized nanostructures.

Structural Investigation of AC@Au/ZnO Nanocomposites

Figure 1B:
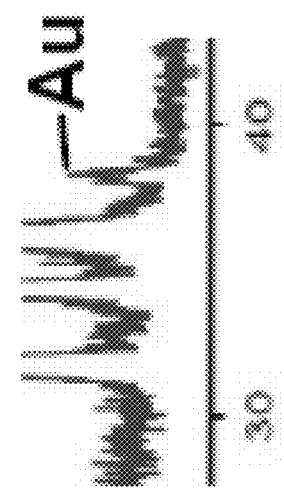
FIG. 1B shows a portion of a PXRD pattern for AC@Au/ZnO nanocomposite photocatalysts showing the presence of crystalline Au.

The XRD patterns were measured for all newly synthesized samples to investigate the crystallinity, phase, and purity. FIG. 1A displays the diffraction trends of AC, undoped ZnO, Au/ZnO, and AC@Au/ZnO nanocomposites. Obtained XRD results of AC very distinctly exhibited a prominent broad weak peak appearing at approximately $2\theta=21°$ indicating amorphous carbon [Chen Q, & Wu Q, J Hazard Mater, 2015, 283, 193-201, incorporated herein by reference in its entirety]. However, bare ZnO showed several distinct peaks at $2\theta=31.5°$, $34.48°$, $36.24°$, $47.4°$, $56.5°$, $62.7°$, $66.5°$, $67.9°$, and $69.1°$ corresponding respectively to (100), (002), (101), (102), (110), (103), (200), (112), and (201) planes, matching the hexagonal wurtzite phase of ZnO in accordance with JCPDS card no. of 36-1451 [Fageria P, et. al., RSC Adv, 2014, 4, 24962-72; Ismail Adel A, et. al., Superlattice Microst, 2016, 95, 128-39; and Haibo O, et. al., Mater Lett, 2013, 111, 217-20, each of which is incorporated herein by reference in its entirety]. For Au/ZnO sample, the obtained diffraction pattern clearly displays all peaks of ZnO having high crystallinity with an additional peak appearing at $2\theta=38.3°$ representing the (111) plane of face centered cubic phase of metallic gold (JSPDS card no. 04-0784) [Ismail A A, et. al., J Mol Catal A Chem, 2012, 358, 145-51 and Ismail A A, et. al., Mater Des, 2016, 109, 530-8, each of which is incorporated herein by reference in its entirety]. For sake of clarity, a magnified image (FIG. 1B) shows the existence of metallic Au in the newly prepared Au/ZnO samples. The AC@Au/ZnO sample exhibits the same diffraction pattern as that of Au/ZnO nanocomposite along with the metallic Au peak. As shown, no peak or signal related to AC could be observed, due to its low content. The AC@Au/ZnO sample shows a weaker diffraction pattern than ZnO or Au/ZnO indicating a slightly lower crystallinity or smaller crystallite size of ternary framework [Alshammari S, et. al., RSC Adv, 2015, 5, 27690, incorporated herein by reference in its entirety]. Furthermore, there is no shift in diffraction pattern of ternary organization confirming the structure of the designed photocatalyst.

Figure 2A:
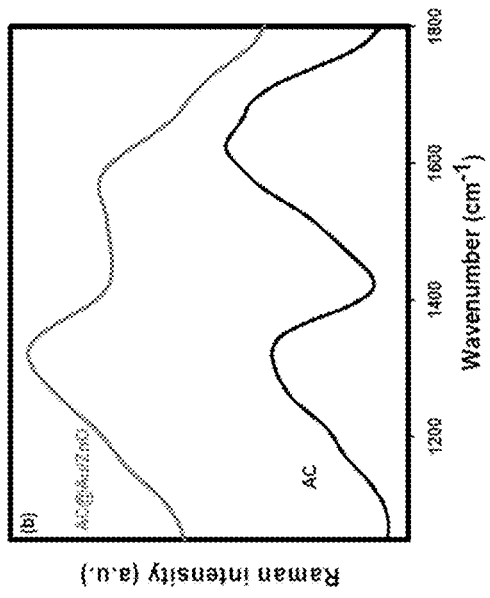
FIGS. 2A-2B are Raman spectra measured for ZnO and Au/ZnO (FIG. 2A) and AC and AC@Au/ZnO (FIG. 2B) nanocomposite photocatalysts.
Figure 2B:
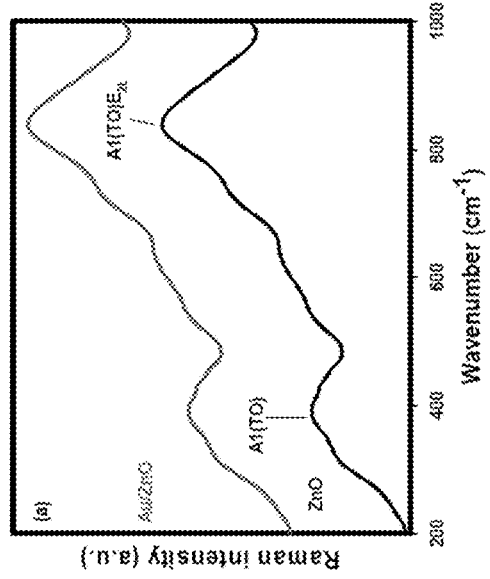

FIG. 2A shows the Raman spectrum of pure ZnO as well as Au/ZnO samples. In the case of bare ZnO, Raman bands appearing at 385 $cm^{-1}$ can be ascribed to the optical phonon: A1 (TO) of the wurtzite hexagonal organization of ZnO [Ismail Adel A, et. al., Superlattice Microst, 2016, 95, 128-39, incorporated herein by reference in its entirety]. Another peak at 830 $cm^{-1}$ is due to the multi-phonon scattering modes: A1 (TO)+$E_{2L}$ [Zeferino R S, et. al., J Appl Phys, 2011, 109, 014308, incorporated herein by reference in its entirety]. The Raman spectrum of Au/ZnO appears to be same as that of pure ZnO with a slight shift towards higher wavenumber which reflects the existence of Au in binary organization and also confirmed the successful creation of composite framework among Au and ZnO. The presence of AC in ternary framework AC@Au/ZnO can be easily confirmed from the bands appearing in FIG. 2B. As can be seen, two well defined bands, showing prominent appearance at 1320 $cm^{-1}$ (signifying D band) and at 1615 $cm^{-1}$ (signifying G band) are both present in AC and AC@Au/ZnO Raman spectra, confirming the presence of AC in AC@Au/ZnO ternary framework. Sufficient defects and vacancies possessed disordered amorphous carbon were confirmed by the presence of D band, which arises due to the A1g mode [Kuang L, & Zhang W., RSC Adv, 2016, 6, 2479, incorporated herein by reference in its entirety], whereas the E2g mode of graphitic carbon was confirmed by G band [Chen Q, & Wu Q, J Hazard Mater, 2015, 283, 193-201, incorporated herein by reference in its entirety]. The presence of amorphous as well as graphitic carbon in biomass derived AC enhances the charge carrier separation during the photochemical treatment. However, in AC@Au/ZnO ternary sample, a slight decrease in band intensity with a minor shift in position were observed which could be attributed to the presence of some defects causing the translational crystal symmetry transformation [Zeferino R S, et. al., J Appl Phys, 2011, 109, 014308, incorporated herein by reference in its entirety].

Figure 3A:
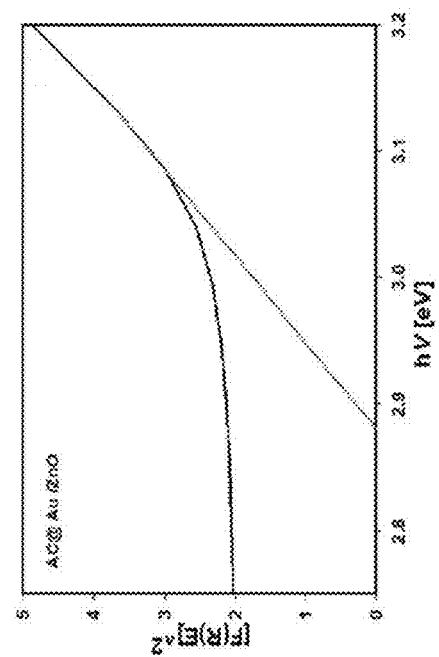
FIG. 3A shows UV-visible diffuse reflectance spectra of AC, ZnO, Au/ZnO, and AC@Au/ZnO nanocomposite photocatalysts.
Figure 3B:
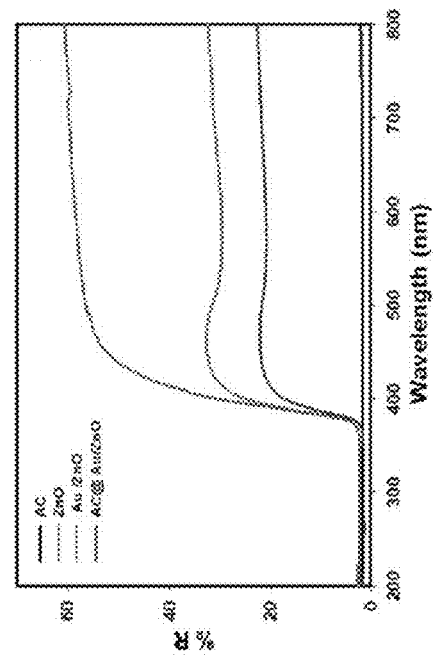
FIG. 3B is a plot of transferred Kubelka Munk vs. energy of absorbed light for AC@Au/ZnO.

The UV-vis spectroscopy in diffuse reflectance mode has also been applied to all prepared samples in order to explore the optical features of synthesized nanostructures. The acquired spectral patterns are demonstrated in FIG. 3A. The KubelkaeMunk (KeM) function F(R) was derived and plotted to acquire the band gap ($E_g$), as optical properties and band gap energy values are very closely interrelated and associated with each other. The band gap ($E_g$) values of the newly designed photocatalysts are attained by putting the tangent lines of the function versus photon energy as shown in FIG. 3B for AC@Au/ZnO ternary sample. Obtained band gap values for undoped ZnO, Au/ZnO, and AC@Au/ZnO nanocomposites are estimated to be 2.98, 2.92, and 2.87 eV, respectively. The obtained value for ZnO band gap is in good agreement with an earlier report [Bouzid H, et al., Catal Today, 2015, 252, 20-6, incorporated herein by reference in its entirety].

Morphological and structural investigations for the fabricated nanocomposites have been conducted on FESEM and presented in FIG. 4A-4E. As seen in FIG. 4A, the FESEM image of pure ZnO shows that the synthesized product possesses spherical shapes as well as elongated morphology grown in high density with average particle size ranging from 20 to 80 nm. FIG. 4B shows the FESEM image of AC, which reveals a bulky micron-sized sheets arranged in stacks or pile manner over one another. FIG. 4C displays the morphological observation of the Au/ZnO nanocomposite, in which the ZnO nanoparticles show the same morphology with a clear and uniform dispersion of Au nanoparticles onto ZnO surface. The FESEM image of AC@Au/ZnO nanocomposite shown in FIG. 4D clearly displays the ternary arrangement among the selected moieties showing the presence of intermingled AC sheets with Au/ZnO nanocomposite demonstrating the successful creation of ternary framework. To determine the elemental composition of the designed ternary framework, the EDS analysis was also performed as shown in FIG. 4E. The EDS analysis clearly confirmed that the designed ternary nanocomposite is composed of zinc, oxygen, carbon and gold only. During the EDS examination, no impurity related peaks could be identified, which clearly confirmed that the designed ternary organization comprises mainly Zn, O, C, and Au.

The TEM images of bare ZnO and AC are shown in FIGS. 5A and 5B. The undoped ZnO has particle-like morphology with a particle size ranging from 20 to 80 nm appeared in high density, while the AC displays sheets-like appearance arranged in stacking or piling manner. As can be seen from FIG. 5C, upon the deposition of 1 wt. % AuNPs, the nanoparticles of Au were uniformly settled onto ZnO nanostructures, and the size of homogeneously dispersed Au particles ranges from 4 to 10 nm. FIG. 5D demonstrates the successful creation of a ternary organization between AC, ZnO, and Au. The TEM image shows each component participating in the formation of the ternary framework, confirming the formation of the intended ternary photocatalyst. The high-resolution (HR-TEM) image of ZnO shown in FIG. 5E show highly distinct lattice fringes confirming the formation of well-ordered crystals with no obvious dislodgment or dislocations. The as-prepared highly crystalline ZnO with a separation of 0.25 nm between adjacent planes is in perfect accordance with earlier reported values for (002) plane of ZnO wurtzite phase [Choi K, et. al., Nanomaterials, 2017, 7, 148 & Faisal M, et. al., Mater Today Commun, 2020, 24, 101048, each of which is incorporated herein by reference in its entirety]. Selected area electron diffraction (SAED) pattern of AC@Au/ZnO nanocomposite sample is shown in FIG. 5F, in which the designed ternary framework exhibits polycrystal rings along with tiny single crystals, indicating a high desirable superior crystallinity of AC@Au/ZnO sample.

Figure 6A:
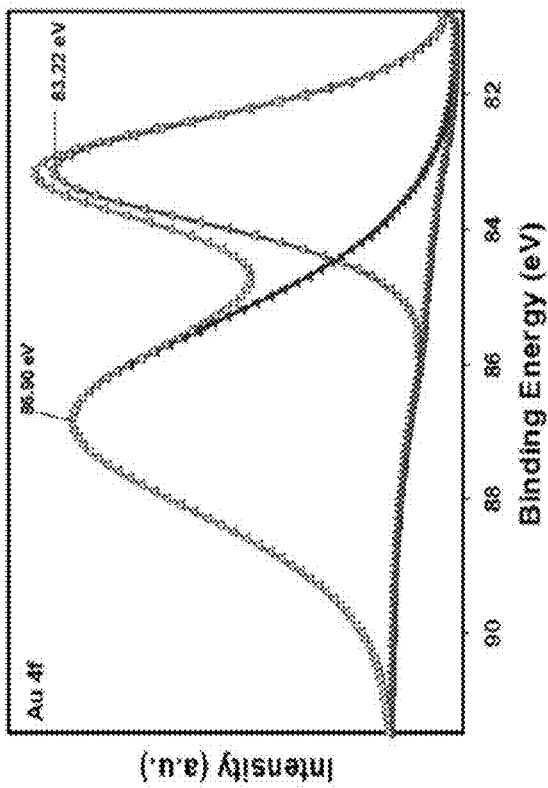
FIGS. 6A-6E are XPS spectra of AC@Au/ZnO where
Figure 6B:
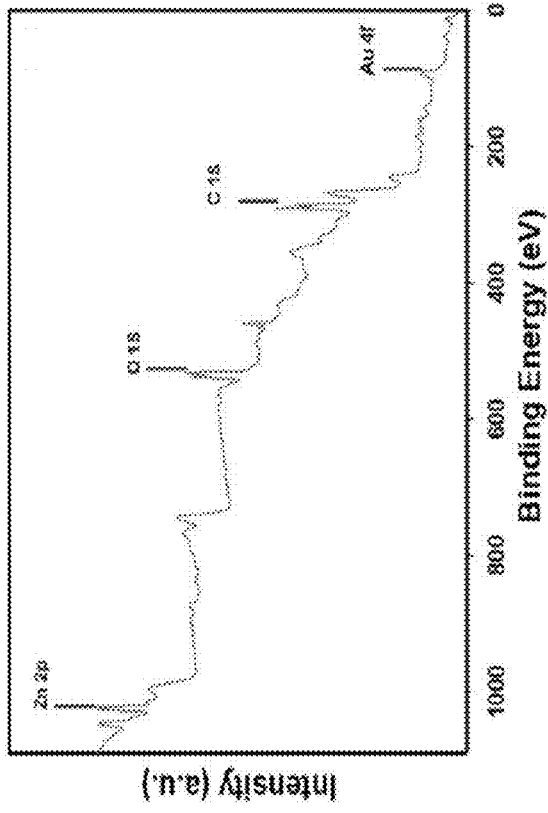
Figure 6E:
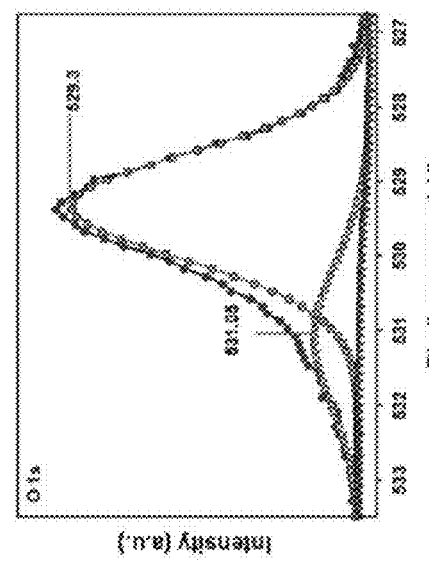
Figure 6D:
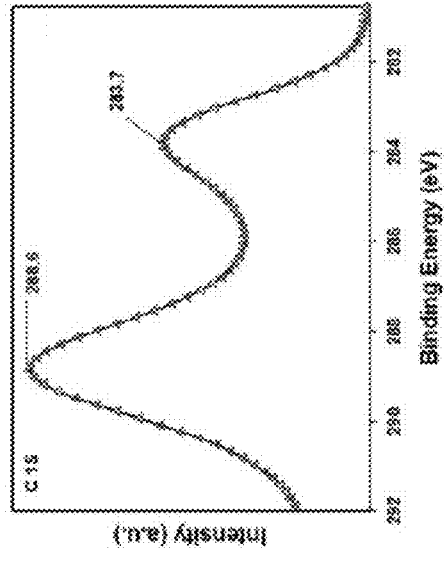
Figure 6C:
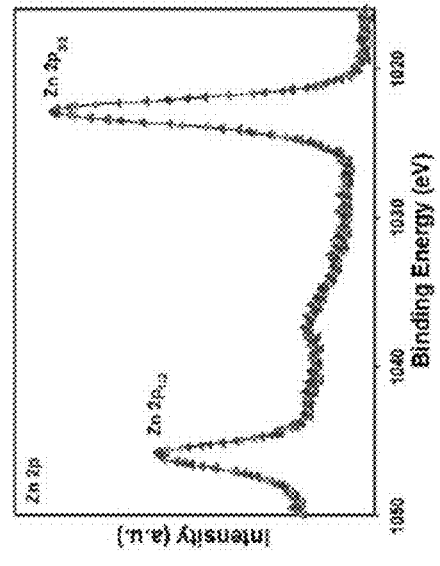

The XPS analysis has also been conducted in order to confirm the successful formation of the ternary nanocomposite. Determination of chemical composition and oxidation state has further been examined by XPS analysis for all newly prepared frameworks. In FIG. 6A, the wide scan XPS results of AC@Au/ZnO photocatalyst demonstrate that the designed material comprises O, C, Au and Zn elements, confirming the successful formation of the ternary framework. The presence of two peaks as shown in FIG. 6B at binding energy values 83.15 eV and 86.80 eV is attributed to the $Au4f_{7/2}$ and $Au4f_{5/2}$, confirming the existence of metallic gold in the compound [Zhu C, et. al., Nanoscale 2012, 4, 1641-6; Li Y, et. al., Energy Environ Sci, 2013, 6, 2156-65; & Xu Z, et. al., Electrochem Commun, 2011, 13, 1260-3, each of which is incorporated herein by reference in its entirety]. The narrow scan spectrum of Zn2p shown in FIG. 6C reveals two peaks at 1022.80 and 1045.86 eV with 23.06 eV peak-to-peak separation, signifying the $Zn2p_{3/2}$ and $Zn2_{1/2}$ spin-orbit coupling, exactly matching with previously available reports [Yousefi M, et. al., Thin Solid Films, 2011, 520, 721-5 & Yang J, et. al., Appl Surf Sci, 2008, 255, 2646-50, each of which is incorporated herein by reference in its entirety]. FIG. 6D depicts two characteristic peaks related to C1s with binding energy of 283.7 and 287.51 eV. The peak at 283.7 eV can be attributed to the graphitic carbon C—C bond originated from the activated carbon present in nanocomposite [Zeng Bin, et. al., J Mater Sci Mater, 2019, 30, 6846-52, incorporated herein by reference in its entirety], whereas the peak located at 288.6 eV shows the presence of C=O in the framework [Jayaraman S, et. al., RSC Adv, 2014, 4, 11288-94 & Lee C W, et. al., Int J Hydrog Energy, 2012, 37, 10557-63, each of which is incorporated herein by reference in its entirety]. FIG. 6E shows the XPS peak of O1s, which can be deconvoluted (by curve fitting) into two peaks appearing at 529.3 eV and 531.05 eV binding energy values, respectively. The peak appeared at 529.3 eV is attributed to $O^{2-}$ ions in the lattice region, while the 531.05 eV peak corresponds to $O^{2-}$ ions present in oxygen deficient areas [Faisal M, et. al., Ceram Int, 2019, 45, 20484-92, incorporated herein by reference in its entirety].

Figure 7B:
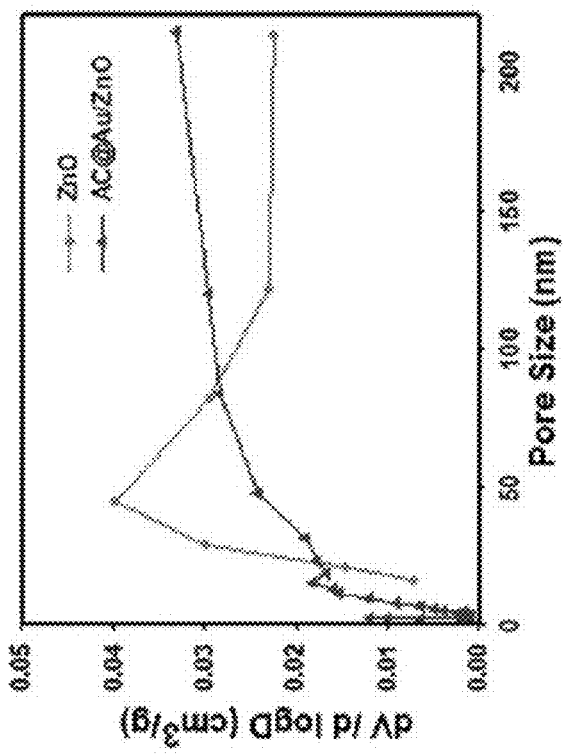
FIG. 7B is a plot of pore size distribution for ZnO and AC@AuZnO nanocomposite photocatalysts.
Figure 7A:
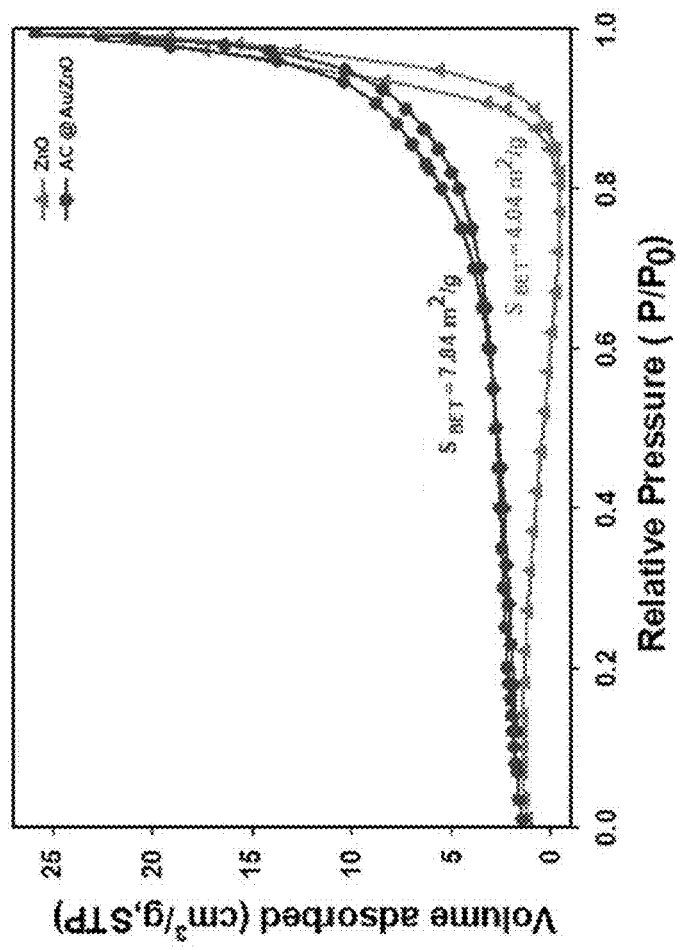
FIG. 7A shows an $N_2$ sorption isotherm for ZnO and AC@AuZnO nanocomposite photocatalysts.

The textural features along with the total pore volume and BET surface area measurement utilizing the nitrogen adsorption/desorption isotherms were carried out for undoped ZnO, and newly designed ternary AC@Au/ZnO framework at 77 K as shown in FIG. 7A. The obtained pattern i.e. type IV isotherm (distinctive for mesoporous materials) possessing thin hysteresis loop-H4, where up to low pressure extending desorption branch demonstrating the development of pores or mesoporous form of both undoped and ternary AC@Au/ZnO framework [Faisal M, et. al., Mater Today Commun, 2020, 24, 101048, incorporated herein by reference in its entirety]. Undoped sample of ZnO showed 4.042 $m^2/g$ BET surface area and 0.019 $cm^3/g$ total pore volume, whereas newly designed ternary AC@Au/ZnO framework gives 7.83 $m^2/g$ BET surface area and 0.022 $cm^3/g$ total pore volume. Obtained results clearly indicate an enhancement of the surface area after combining AC and AuNPs in ZnO, and this is probably due to the insertion of AC sheets and Au nanoparticles into the ZnO framework. In addition to this, the total pore volume increased with the doping of AC sheets and Au nanoparticles into the ZnO framework demonstrating that the addition of AC and Au has no detrimental effect on the porous organization. The pore size distribution as shown in FIG. 7B shows that pure ZnO pore size is 19.51 nm which is larger than that of ternary AC@Au/ZnO framework (11.11 nm), revealing that the ternary nanocomposite comprises finer constituents than the bare ZnO [Wang D, et. al., Microchimica Acta, 2019, 186, 1, incorporated herein by reference in its entirety].

Evaluation of Photocatalytic Activity

Superoxide radical anion ($O_2^-\cdot$) and Hydroxyl radicals (·OH) are the key components produced during the photocatalytic treatment process and are vital for the removal and destruction of highly toxic compounds. These main species cause the breakdown of a highly complex collection of organic pollutants bearing chains of C—C and C—H bonds. The enhancement in life span of electron and hole pairs by the effective separation, as well as improvement in surface area of newly designed photocatalyst are key factors extremely important and responsible for the enhancement of its photocatalytic efficiency.

The photocatalytic capability of AC, undoped ZnO, Au/ZnO, and AC@Au/ZnO nanocomposites have been successfully tested under visible light illumination towards the gemifloxacin mesylate drug as a target pollutant. Gemifloxacin solution showed sufficient stability when treated only with visible light without photocatalyst, demonstrating no photolysis or observable decrease in drug concentration after 35 min exposure to visible light. However, all newly produced catalysts like AC, undoped ZnO, Au/ZnO, and AC@Au/ZnO nanocomposites showed their photocatalytic potential with destruction of target drug pollutant to different levels. Among the photocatalysts, the newly developed AC@Au/ZnO nanocomposite was found to be extremely effective towards the treatment and destruction of gemifloxacin molecule.

Figure 8A:
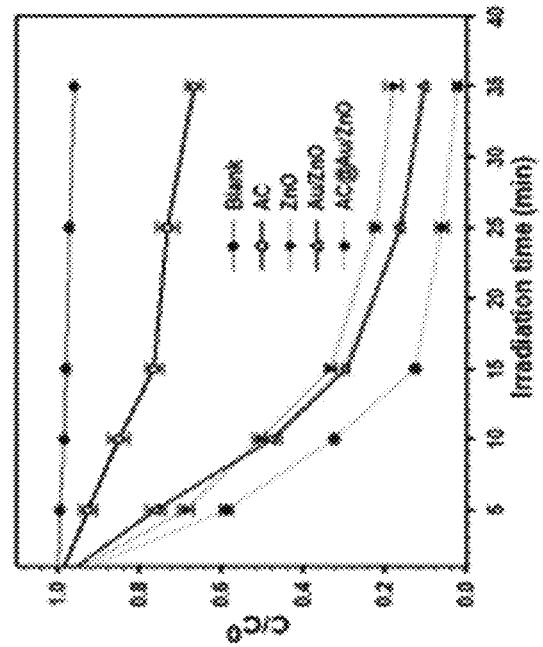
FIG. 8A is plot of absorbance vs. wavelength as a function of illumination time for photocatalytic degradation of gemifloxacin mesylate drug using AC@Au/ZnO nanocomposite photocatalyst.

FIG. 8A displays the change in absorption spectra of gemifloxacin molecule when treated with AC@Au/ZnO ternary nanocomposite under visible light illumination. As the photocatalytic treatment process proceeds, the two prominent bands at λ=264 nm and λ=340 nm diminish in intensity and the absorption hump reaches the baseline very rapidly after only 35 min of visible light irradiation. Totally flattened adsorption spectra of target gemifloxacin molecule in presence of AC@Au/ZnO ternary photocatalyst in just 35 min of irradiation demonstrated the high efficacy of AC@Au/ZnO ternary photocatalyst.

Figure 8B:
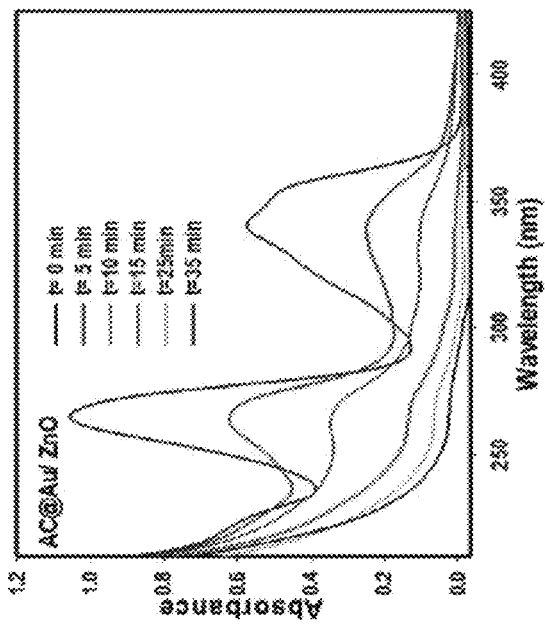
FIG. 8B is a plot of change in concentration vs. irradiation time for the decomposition of gemifloxacin mesylate drug using the prepared samples AC, ZnO, Au/ZnO, and AC@Au/ZnO nanocomposite photocatalysts.

Investigations revealed the change in drug concentration in the presence and absence of newly developed nanostructures under visible light source are presented in FIG. 8B. Observed trends demonstrate that there is no change or decrease in gemifloxacin drug concentration when tested without photocatalyst under visible light source. However, highly advantageous results in terms of photocatalytic performances have been displayed by the newly synthesized photocatalysts after 35 min of illumination. It is important to mention here that both Au/ZnO and AC@Au/ZnO nanocomposite frameworks showed higher photocatalytic activity than pure ZnO, signifying the importance of composite organization towards the development and designing of a smart photocatalyst. The obtained degradation pattern undoubtedly reflects that only 33% (in presence of AC) and 82.20% (with undoped ZnO) drug removal was observed after 35 min of visible light treatment. In contrast, the hybrid structures Au/ZnO and AC@Au/ZnO were found to be highly effective, signifying the importance and role of composite structures in the development of efficient photocatalysts. Among all materials tested, the newly fabricated ternary AC@Au/ZnO nanocomposite was found to be a supreme candidate, displaying exceptional activity with 98% of drug removal after 35 min of visible light illumination. Steps like heterojunction creation during fabrication of efficient photocatalysts were found to be vital in overcoming the decidedly energy wasting phenomenon of electron-hole pair recombination. As can be seen from the obtained degradation percent results of gemifloxacin drug molecule, there is an influential increase in degradation percent as the ternary organization of AC, Au, and ZnO has been applied for the treatment of target analytes. The elevated performance of AC@Au/ZnO nanocomposite compared to other investigated photocatalysts might be due to the successful formation of heterojunctions among the selected moieties which results in an effective retardation in the recombination process of electron and hole pairs generated during the photochemical reactions.

Figure 8C:
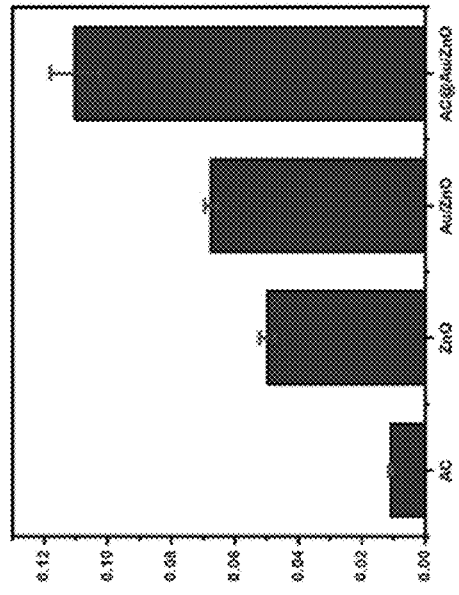
FIG. 8C is a comparison of rate constant (k), for the decomposition of gemifloxacin mesylate drug using the prepared samples AC, ZnO, Au/ZnO, and AC@Au/ZnO nanocomposite photocatalysts.

All the prepared photocatalysts were also used for the assessment of rate constant (k) as shown in FIG. 8C, which shows the photodegradation rates of a particular photocatalysts. Obtained rate constant (k) values clearly indicate the significance of composite structure formation, as the k value increases linearly from $1.09 \times 10^{-2}$ min$^{-1}$ (AC), $4.98 \times 10^{-2}$ min$^{-1}$ (ZnO), $6.75 \times 10^{-2}$ min$^{-1}$ (Au/ZnO) to $11.02 \times 10^{-2}$ min$^{-1}$ (AC@Au/ZnO ternary framework). The rate constant (k) results clearly demonstrate that the AC@Au/ZnO ternary framework exhibited the highest destruction rate which is 2.21 times higher than that of pure ZnO. Obtained degradation trends very clearly demonstrated the superior nature of AC@Au/ZnO for the degradation of the target drug molecule. One possible reason for the enhanced performance of AC@Au/ZnO photocatalyst might be the smaller band gap energy resulting in advancement in absorption edge (i.e., in visible part of spectrum) as compared to other nanostructures. The smaller band gap allows for production of electron/hole pairs using less energy during the course of the photoreaction and allows for use of a higher fraction of the visible spectrum [Zhou Kong J, et. al., Nanoscale Res Lett, 2017, 12, 526, incorporated herein by reference in its entirety]. Another possibility behind the excellent performance of AC@Au/ZnO ternary framework is its high surface area compared to that of bare ZnO, which in turn increases the degradation rate. Furthermore, outstanding results of the ternary framework among all designed photocatalysts might be due to the heterojunction formation among AC, Au, and ZnO which increases the effective separation rate of electron and hole pairs, resulting in enhanced performance. The obtained degradation results are in good agreement with the PL spectral analysis (explained below). This result demonstrates that the synergistic or cumulative efforts of AC, Au, and ZnO played a decisive role in producing the high performance for the removal of the drug molecule.

Figure 9:
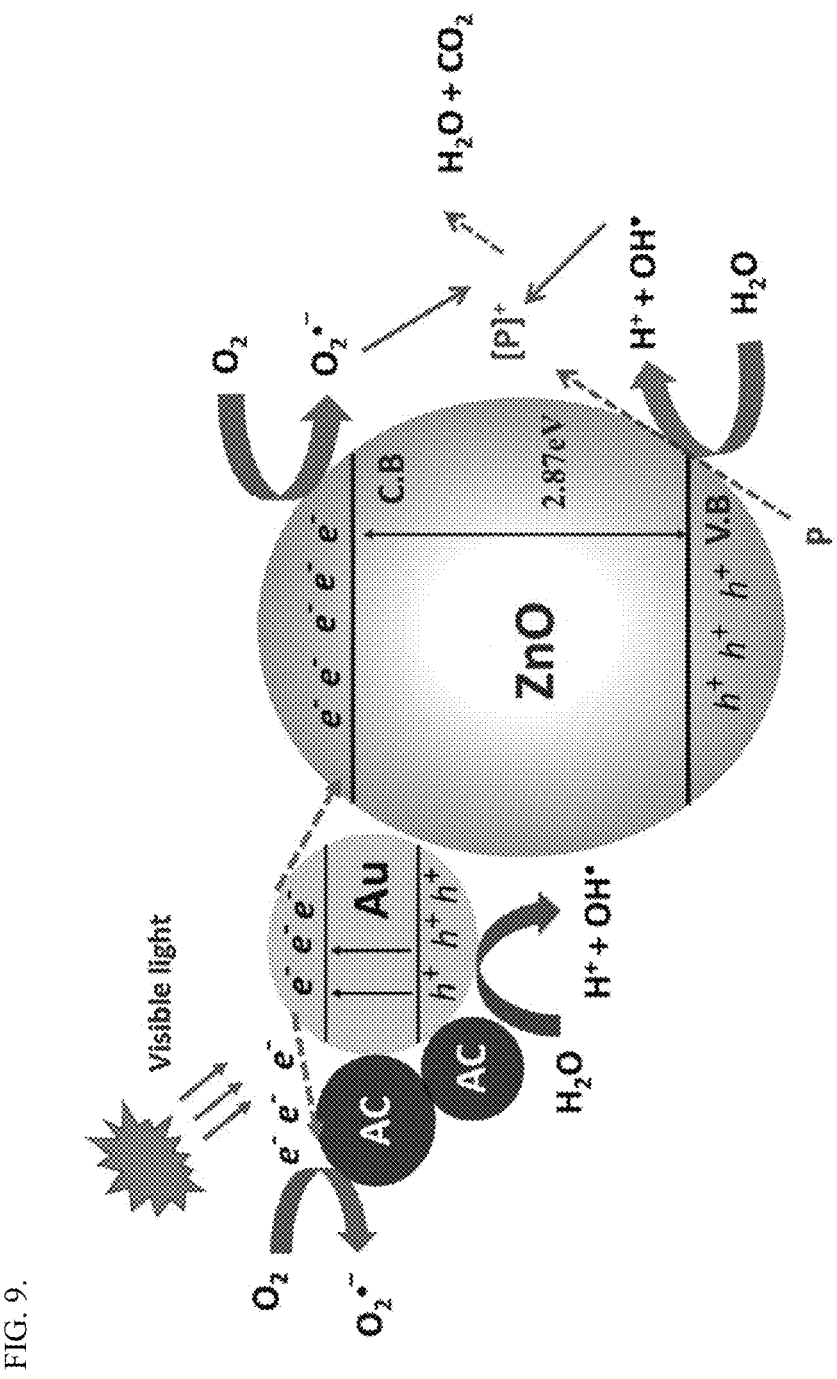
FIG. 9 shows a proposed working mechanism of AC@Au/ZnO ternary photocatalyst.

Considering all above characterization and investigational facts, the extremely advantageous photocatalytic performance of AC@Au/ZnO ternary framework might be due to its outstanding light harvesting skills and excellent separation capability of charge carriers. The AC@Au/ZnO ternary framework showed the highest photocatalytic performance as it possessed the combined advantageous features of both Au—ZnO and ZnO-AC nanocomposites. A proposed mechanism for the degradation of gemifloxacin drug molecule when treated by the AC@Au/ZnO photocatalyst is shown in FIG. 9. As confirmed from diffuse reflectance spectroscopy, the as-fabricated AC@Au/ZnO nanocomposite band gap is appropriate for visible light absorption, an ecofriendly light source for the treatment process. As the ternary framework exposed to the visible light source, the AuNPs localized SPR could lead to the creation of electrons and holes by exciting the surrounding semiconductor [Long J, et. al., Energy Environ Sci, 2014, 7, 973-7, incorporated herein by reference in its entirety]. Thus, simultaneous production of electrons (e) in ZnO conduction band (CB) and generation of holes (hi) in valence band (VB) could take place (FIG. 9). Ultrafast channeling of electrons could occur between AuNPs and the CB of ZnO at the Au—ZnO interface via surface plasmon resonance mechanism resulting in creation of holes on the metal surface [Fageria P, et. al., RSC Adv, 2014, 4, 24962-72 & Kumar S G, and Rao K S R K, Appl Surf Sci, 2017, 391, 124-48, each of which is incorporated herein by reference in its entirety]. These photogenerated electrons in CB of ZnO move to the surface, react with dissolved oxygen and produce highly reactive superoxide radical anion ($O^{2-}\cdot$) and subsequently could lead to the destruction of drug molecule framework [Perillo P M, and Atia M N, Nano Struct Nano Objects, 2017, 10, 125-30; Ansari S A, et. al., New J Chem, 2017, 41, 9314; & Zhou K, et. al., Mater Lett, 2013, 98, 213-6, each of which is incorporated herein by reference in its entirety]. Meanwhile, other photogenerated oxidizing agents are the photogenerated holes, smoothly migrate to the ZnO or AuNPs surface and could play a vital role in degradation of complex organic pollutants [Park Y, et. al., Cryst Eng Comm, 2014, 16, 3155-67, incorporated herein by reference in its entirety]. Some holes in combination with adsorbed OH$^-$ species formed ·OH to degrade the target moieties. The synergistic or cumulative effect of Au, AC, and ZnO expedited the generation process of hydroxyl and superoxide radicals and efficiently outcompete the recombination process, which altogether led to the development of promising AC@Au/ZnO ternary photocatalyst with extraordinary performance.

Figure 10:
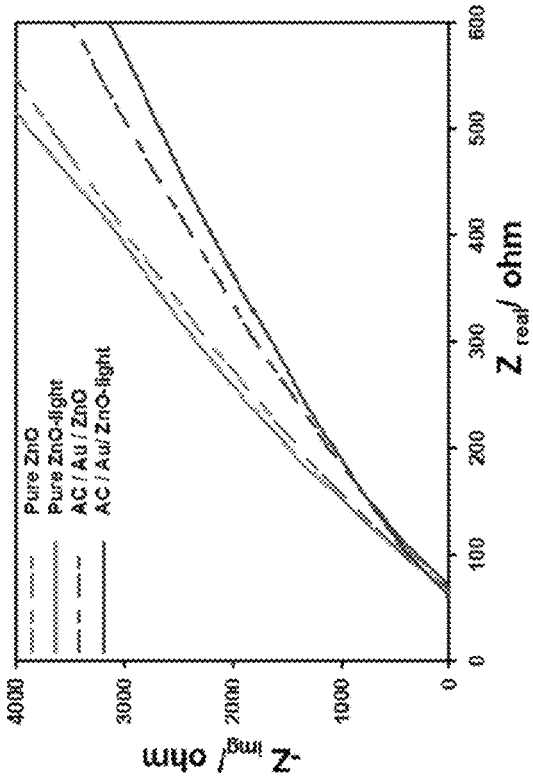
FIG. 10 is a room-temperature photoluminescence (PL) spectra of the prepared photocatalysts: ZnO, Au/ZnO, and AC@Au/ZnO nanocomposite photocatalysts (excited at λ=350 nm).

The PL spectroscopy is another significant tool to understand the mechanism behind the photocatalytic reaction of designed material. Therefore, the PL analysis for newly prepared ZnO, Au/ZnO, and AC@Au/ZnO nanostructures at an excited wavelength 350 nm were performed at room temperature and the results are displayed in FIG. 10. As can be seen, the ZnO nanoparticles showed the maximum PL intensity, whereas the AC@Au/ZnO hybrid sample exhibited the lowest PL spectral intensity. Such a decrease in the PL intensity signifies the efficient separation of the charge carriers in case of the ternary framework [Do J Y, et. al., Appl Surf Sci, 2019, 494, 886-94; Ismail A A, et. al., J Environ Sci, 2018, 66, 328-37; & Faisal M, et. al., Sep Purif Technol, 2018, 190, 33-44, each of which is incorporated herein by reference in its entirety]. The AC@Au/ZnO nanostructures as already proven to be highly efficient and showed superior performance among all photocatalysts might be due to the dominance in separation of charge carriers. Obtained PL results are perfectly in line with the photocatalytic results.

Figure 11:
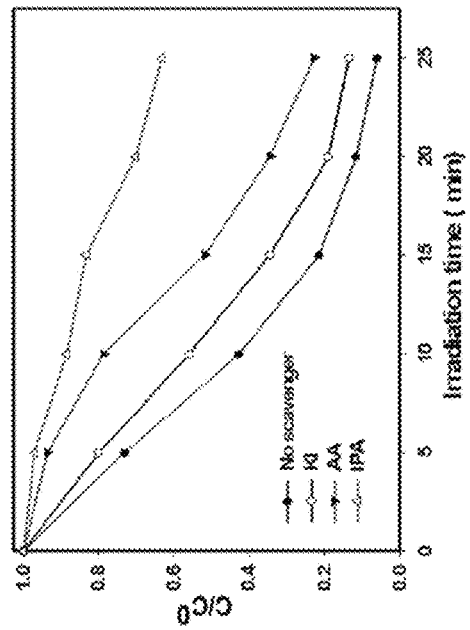
FIG. 11 is an EIS Nyquist plots of pure ZnO and AC@Au/ZnO coated GC electrodes in 0.1 M $Na_2SO_4$ aqueous solution at 1.0 V vs. Ag/AgCl (KCl sat.) and 10 mV signal amplitude in the frequency range from 102 to $10^5$ Hz; with and without light irradiation.

The electrochemical impedance spectra (EIS) of ZnO and AC@Au/ZnO coated electrodes investigated in absence and presence of illumination are shown in FIG. 11. The magnitude or size of arc attained from the Nyquist plots revealed detailed statistics about the effective charge separation and efficient electron movement at the surface of the electrodes. It is also clear that the size of the arc follows the following order; ZnO (dark)>ZnO (light)>AC@Au/ZnO (dark) >AC@Au/ZnO (light), where the ternary framework AC@Au/ZnO under the illumination possesses the lowest arc radius during the EIS Nyquist measurement, demonstrating the significance of tailoring or structural modification responsible for reduction in charge transfer resistance. This will boost the interfacial charge transfer kinetics which could lead to a retardation of high energy wasting process i.e., recombination of photogenerated electron-hole pairs. The obtained plots clearly showed that under visible light irradiation, there was radical decrease in charge transfer resistance of ternary framework AC@Au/ZnO, a highly promising and encouraging factor in the designing and development of novel visible light responsive photocatalysts. Therefore, the above results demonstrate that the semiconductor material like ZnO on exposure to visible light led to the creation of electrons and holes in the conduction band and valence band along with highly advantageous SPR effect due to the presence of AuNPs, can effectively stimulate charge transfer phenomenon in ZnO organization leading to enhancement in ternary photocatalyst performance [Pathak T K, et. al., Vacuum, 2018, 157, 508-513509 & Jung H J, et. al., J Alloy Compd, 2018, 735, 2058, each of which is incorporated herein by reference in its entirety]. These results are consistent with the spectral PL results as well as the photocatalytic studies.

Figure 12A:
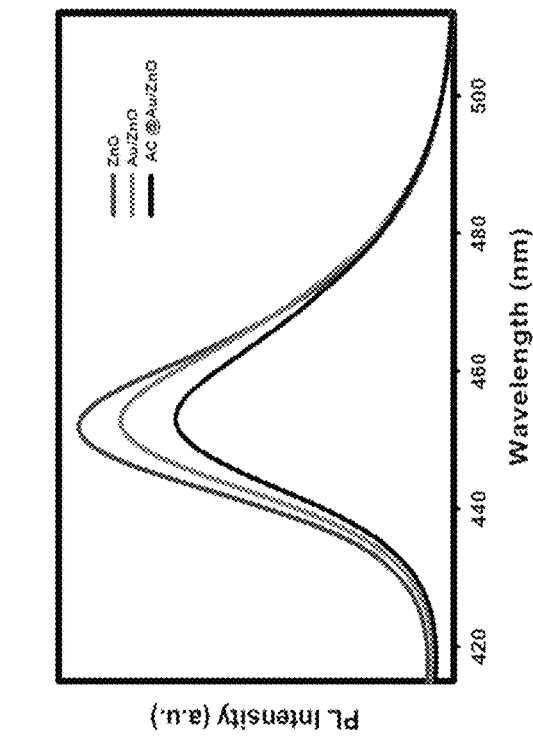
FIG. 12A is a plot of absorbance vs. wavelength as a function of illumination time for the photocatalytic degradation of methylene blue (0.022 mM solution) with AC@Au/ZnO nanocomposite photocatalyst.

To further confirm the destruction skills or reactive capability of the newly designed AC@ Au/ZnO ternary framework, it was for the destruction of colored organic dye molecules like methylene blue (MB), which are very common and extensively utilized in various sectors for a wide range of applications. FIG. 12A shows the change in the spectrum (absorption spectra) of MB in the presence of AC@Au/ZnO ternary framework under visible light illumination. Two highly prominent bands (MB dye molecule) are observable at $\lambda=291$ nm and $\lambda=663$ nm and very rapidly lose their identities with no intensity after 30 min of irradiation under visible light. Highly promising results for the destruction of MB in the presence of AC@Au/ZnO ternary framework further demonstrate the influential potential or capability of the designed photocatalyst. The degradation of MB or removal of MB dye may occur by an oxidative route, leading to treatment or destruction of a target analyte or by conversion or transfiguration of MB to a colorless form i.e., leuco-MB by a two-electron reduction route [Bouzid H, et. al., Catal Today, 2015, 252, 20-6 & Zhang L Z, and Yu J C, Chem Commun, 2003, 2078, each of which is incorporated herein by reference in its entirety]. Here a distinctive absorption band at $\lambda=256$ nm for the leuco-MB is not observed during the entire photocatalytic treatment of dye molecule, confirming the destruction of MB via an oxidative route. The the AC@Au/ZnO ternary nanocomposites have promising prospects in photocatalysis for the treatment of notorious and harmful pollutants.

Figure 12B:
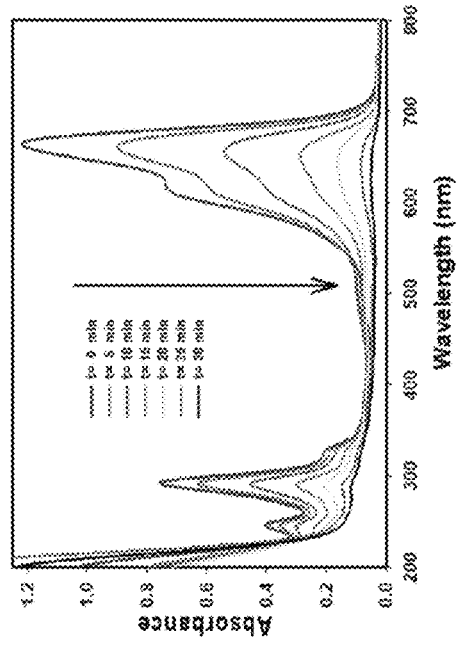
FIG. 12 B is a plot of the photodegradation of MB under visible light irradiation using AC@Au/ZnO nanocomposite photocatalyst in the presence of different scavengers.

In order to explore the role of reactive species during the photocatalysis examination, trapping experiments were conducted using different types of scavengers. Typically, each scavenger with 0.01 M solution concentration was added to the MB dye solution (target analyte): potassium iodide (KI) considered to be a good hole ($h^+$) scavenger, ascorbic acid (AA) a well-recognized superoxide radical anion ($O_2^{-}\cdot$) scavenger, and isopropyl alcohol (IPA) which can act as a highly capable hydroxyl radical ($\cdot$OH) scavenger [Helal A, et. al., Appl Catal B Environ, 2017, 213, 18-27 & Peng Y, et. al., Appl Catal B Environ, 2017, 203, 946-54, each of which is incorporated herein by reference in its entirety]. As can be seen from FIG. 12B, after the addition of sacrificial reagents, AA, KI, and IPA, observed degradation efficiencies followed the order: without scavenger>KI>AA>IPA clearly indicating that the degradation of target dye molecule was dramatically retarded by the addition of IPA, demonstrating that hydroxyl radicals ($\cdot$OH) formed during the course of photoreaction are the major reactive species responsible for the efficient photocatalytic process. Meanwhile, the addition of other species like KI and AA displayed a nominal influence, demonstrating that $h^+$ and $O_2^{-}\cdot$ played only an assistive role during the photocatalytic treatment.

Figure 13:
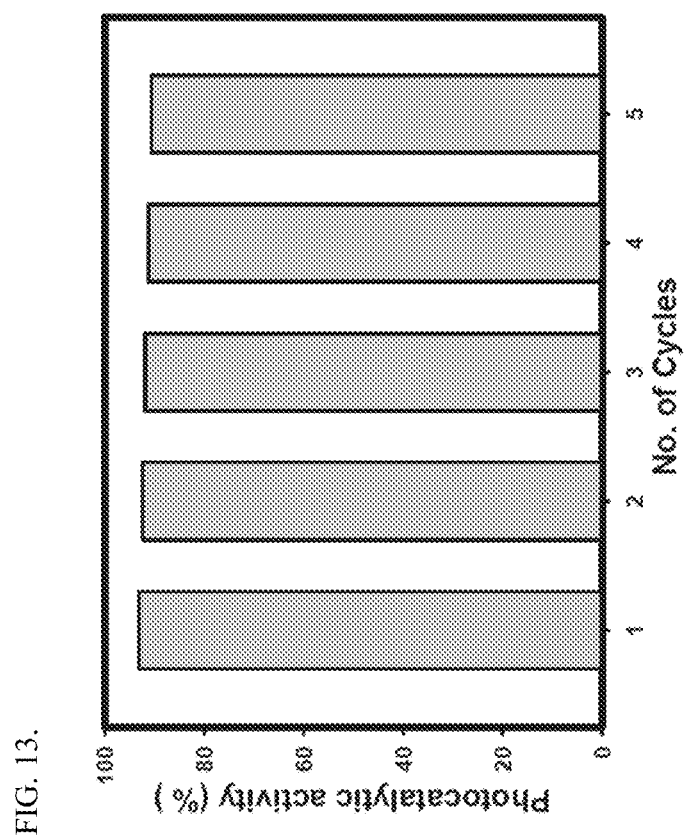
FIG. 13 is a plot of % photocatalytic activity vs number of cycles of the photocatalytic degradation of gemifloxacin mesylate drug with AC@Au/ZnO nanocomposite photocatalyst.

As far as practical applicability or future of any newly designed photocatalyst framework, the stability and reproducibility can be demonstrated. Therefore, the AC@Au/ZnO ternary nanocomposite has been successively tested for five consecutive runs for the destruction of gemifloxacin mesylate drug as shown in FIG. 13. Results were highly promising where AC@Au/ZnO nanostructures displayed sufficient stability with minimal reduction (almost negligible) in photocatalytic efficiency, demonstrating the highly advantageous features of the newly designed framework towards its application in environmental remediation. Slight lowering in photocatalytic activity may arise due to the loss of AC@Au/ZnO material as a result of the washing and separation of photocatalyst during the recycling procedure for further utilization.

The invention claimed is:

1. A nanocomposite photocatalyst, comprising
   1 to 12.5 wt % a carbon nanomaterial comprising amorphous carbon and graphitic carbon;
   82.5 to 98.9 wt % metal oxide nanoparticles disposed on the carbon nanomaterial; and
   0.1 to 5 wt % noble metal nanoparticles disposed on the metal oxide nanoparticles and/or the carbon nanomaterial, each based on a total weight of nanocomposite photocatalyst,
   wherein the nanocomposite photocatalyst has a mean surface area of 5 to 10.5 m/g, a mean pore size of 5 to 20 nm, and a mean pore volume of 0.010 to 0.035 cm$^3$/g.

2. The nanocomposite photocatalyst of claim 1, wherein: the carbon nanomaterial is present in the form of nanosheets having a mean thickness of 50 to 500 nm and a mean width of 500 to 5000 nm.

3. The nanocomposite photocatalyst of claim 1, wherein the metal oxide nanoparticles comprise a metal oxide which is at least one selected from the group consisting of zinc oxide, zirconium oxide, titanium dioxide, iron oxide, aluminum oxide, molybdenum oxide, cerium oxide, and copper oxide.

4. The nanocomposite photocatalyst of claim 3, wherein the metal oxide is zinc oxide.

5. The nanocomposite photocatalyst of claim 1, wherein the metal oxide nanoparticles are crystalline by PXRD, and have a mean particle size of 10 to 100 nm.

6. The nanocomposite photocatalyst of claim 5, wherein the metal oxide nanoparticles are zinc oxide with a wurtzite crystal structure.

7. The nanocomposite photocatalyst of claim 1, wherein the noble metal nanoparticles are gold nanoparticles.

8. The nanocomposite photocatalyst of claim 1, wherein the noble metal nanoparticles have a mean particle size of 1 to 15 nm.

9. The nanocomposite photocatalyst of claim 1, wherein:
- the carbon nanomaterial is present in the form of nanosheets having a mean thickness of 50 to 500 nm and a mean width of 500 to 5000 nm;
- the metal oxide nanoparticles comprise a metal oxide which is zinc oxide with a wurtzite crystal structure which are crystalline by PXRD and have a mean particle size of 10 to 100 nm; and
- the noble metal nanoparticles are gold nanoparticles having a mean particle size of 1 to 15 nm.

\* \* \* \* \*